US012273002B2

(12) United States Patent
Sasaki et al.

(10) Patent No.: US 12,273,002 B2
(45) Date of Patent: Apr. 8, 2025

(54) ELECTRIC WORK MACHINE AND MANUFACTURING METHOD THEREFOR

(71) Applicant: MAKITA CORPORATION, Anjo (JP)

(72) Inventors: Yoshinori Sasaki, Anjo (JP); Yoshihiro Kimura, Anjo (JP)

(73) Assignee: MAKITA CORPORATION, Anjo (JP)

(*) Notice: Subject to any disclaimer, the term of this patent is extended or adjusted under 35 U.S.C. 154(b) by 407 days.

(21) Appl. No.: 17/658,322

(22) Filed: Apr. 7, 2022

(65) Prior Publication Data

US 2022/0337117 A1 Oct. 20, 2022

(30) Foreign Application Priority Data

Apr. 15, 2021 (JP) .................................. 2021-069252

(51) Int. Cl.
*H02K 5/02* (2006.01)
*H02K 1/16* (2006.01)
(Continued)

(52) U.S. Cl.
CPC ................. *H02K 5/02* (2013.01); *H02K 1/16* (2013.01); *H02K 1/27* (2013.01); *H02K 7/003* (2013.01); *H02K 7/14* (2013.01); *H02K 9/06* (2013.01)

(58) Field of Classification Search
CPC .......... H02K 1/16; H02K 7/003; H02K 11/33; H02K 9/06; H02K 5/225; H02K 1/185;
(Continued)

(56) References Cited

U.S. PATENT DOCUMENTS 4,264,834 A * 4/1981 Armor .................... H02K 9/10
310/55
6,783,430 B1 * 8/2004 Tawara ............... F15B 15/2815
451/344
(Continued)

FOREIGN PATENT DOCUMENTS

CN 107269378 A * 10/2017 ............... F01P 5/04
JP 2020185652 A 11/2020
WO 2021033473 A1 2/2021

OTHER PUBLICATIONS

Translation of foreign Patent document CN 107269378 A (Year: 2017).*
(Continued)

*Primary Examiner* — Alex W Mok
(74) *Attorney, Agent, or Firm* — J-TEK LAW PLLC; Jeffrey D. Tekanic; Scott T. Wakeman

(57) ABSTRACT

An electric work machine (1; 201) includes: a motor housing (6; 212) having a tube part (6C; 212C) and a bottom part (6M; 212M); a brushless motor (5; 228) having a stator (20), which has a first contact surface (58F; 258F), and a rotor (21; 231) disposed in the stator; a baffle plate (25; 285); and an output shaft (31; 292). The stator includes a tube-shaped stator core (50) having a ring-shaped second contact surface (50S; 250S) that is opposite of the first contact surface, and coils (56; 256) wound on the stator core. The stator is held by the motor housing with the first contact surface in contact with the bottom part. A protruding part (25S; 285S) of the baffle plate contacts the entire circumference of the second contact surface of the stator core and is fixed to the motor housing by three or more screws (68; 288).

20 Claims, 16 Drawing Sheets

(51) Int. Cl.
  *H02K 1/27* (2022.01)
  *H02K 7/00* (2006.01)
  *H02K 7/14* (2006.01)
  *H02K 9/06* (2006.01)

(58) Field of Classification Search
  CPC .......... H02K 7/145; H02K 7/14; H02K 7/116;
              H02K 5/02; H02K 3/522; H02K 21/16;
              H02K 1/27
  USPC .......................................................... 310/58
  See application file for complete search history.

(56) References Cited

U.S. PATENT DOCUMENTS

| | | | | |
|---|---|---|---|---|
| 9,954,418 | B2* | 4/2018 | Kawakami | B24B 23/028 |
| 10,513,005 | B2* | 12/2019 | Kawakami | B24B 23/02 |
| 10,618,157 | B2* | 4/2020 | Hashimoto | B25D 16/00 |
| 10,749,405 | B2* | 8/2020 | Nagahama | B25F 5/008 |
| 10,811,937 | B2* | 10/2020 | Kawakami | B25F 5/02 |
| 10,875,170 | B2* | 12/2020 | Numata | H02K 9/06 |
| 10,903,718 | B2* | 1/2021 | Nagahama | H02K 3/28 |
| 10,913,142 | B2* | 2/2021 | Takeda | B25F 5/008 |
| 2016/0149463 | A1 | 5/2016 | Smith et al. | |
| 2019/0111551 | A1* | 4/2019 | Kato | B25F 5/001 |
| 2020/0056350 | A1* | 2/2020 | Shirouzu | F15B 11/165 |
| 2020/0126319 | A1* | 4/2020 | Russ | G06V 20/41 |
| 2020/0366161 | A1 | 11/2020 | Sasaki | |
| 2020/0384597 | A1* | 12/2020 | Numata | B25F 5/026 |
| 2020/0384627 | A1* | 12/2020 | Numata | B24B 23/005 |
| 2022/0263377 | A1 | 8/2022 | Sasaki et al. | |

OTHER PUBLICATIONS

Office Action from the Japanese Patent Office dispatched Sep. 3, 2024, in counterpart Japanese application No. 2021-069252, and translation thereof.

* cited by examiner

ELECTRIC WORK MACHINE AND MANUFACTURING METHOD THEREFOR

CROSS-REFERENCE

The present application claims priority to Japanese patent application serial number 2021-069252 filed on Apr. 15, 2021, the contents of which are incorporated fully herein by reference.

TECHNICAL FIELD

The present invention generally relates, in one aspect, to electric work machines that utilize an electric motor, such as: power tools, such as a circular saw, a grinder, a hammer drill, and a large impact wrench; gardening tools, such as a lawn mower; pneumatic-tool air compressors; and transport vehicles. In addition or in the alternative, the present invention generally relates to an electric work machine manufacturing method.

BACKGROUND ART

Hammer drills and other types of electronic work machines, such as circular saws and grinders, that use a brushless motor as its drive source are known.

SUMMARY

For electric work machines, such as circular saws, grinders, hammer drills, etc., there is a desire for a technology that can curtail (reduce) the occurrence of noise caused by stator resonance, preferably at a lower cost than conventional noise reducing techniques.

In a first aspect of the present disclosure, an electric work machine may comprise a motor housing comprising a tube part and a bottom part. The electric work machine may comprise a brushless motor comprising a stator, which has a first contact surface, and a rotor, which is inward (disposed in the interior) of the stator and rotates. The electric work machine (e.g., a circular saw, a grinder, a hammer drill, etc.) may comprise a tubular member made of a resin (polymer). The electric work machine also may comprise an output part (such as an output shaft, on which a tool accessory is mounted). The stator may comprise a stator core, which has a tube shape and has a ring-shaped second contact surface that is opposite of the first contact surface. The stator may have a plurality of coils wound around (on) the stator core. The stator may be held by the motor housing in the state in which the first contact surface is in contact with the bottom part of the motor housing. The rotor may comprise a rotor shaft, which is supported in a rotatable manner by the motor housing. The rotor may comprise a rotor core, which is fixed to the rotor shaft. The rotor may comprise one or more permanent magnets, which is (are) supported by (in) the rotor core. The tubular member may make contact over (along) the entire circumference of the second contact surface of the stator core. The tubular member may be fixed to the motor housing by three or more screws.

In another aspect of the present disclosure, an electric work machine manufacturing method is disclosed. This electric work machine manufacturing method may be a method of manufacturing a second electric work machine, the type of which is different from a first electric work machine in which a stator of a brushless motor is fixed by a first number of screws. In the electric work machine manufacturing method, the (e.g., same) stator may be fixed in the second electric work machine by a second number of screws, which differs from the first number.

According to the electric work machine and the electric work machine manufacturing method of the present disclosure, it is possible to curtail or reduce the occurrence of noise caused by stator resonance, e.g., at a lower cost than conventional noise-reducing techniques.

DETAILED DESCRIPTION

Figure 1:
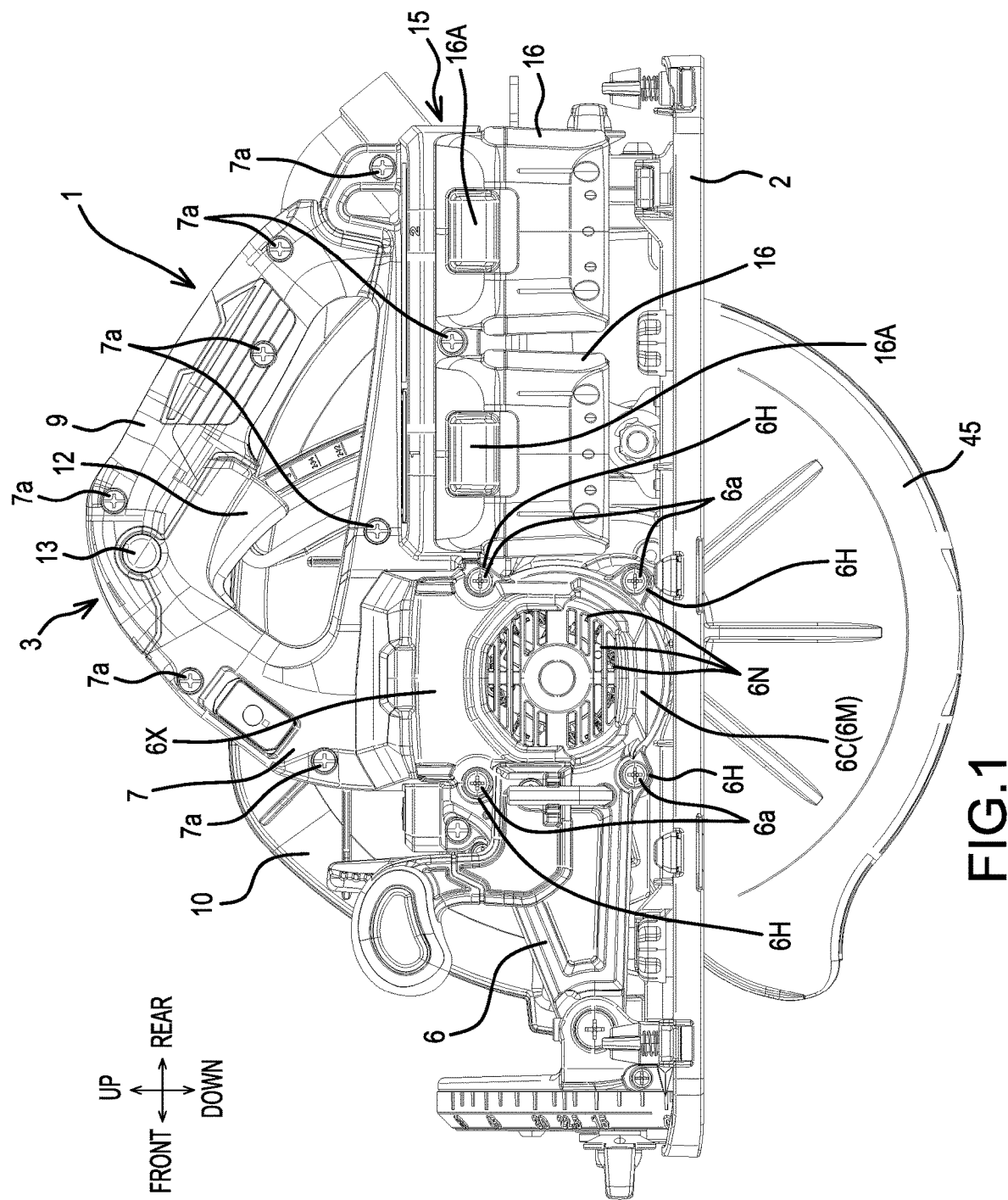
FIG. 1 is a left side view of a circular saw according to a first embodiment of the present disclosure.

An electric work machine, such as a circular saw, a grinder or hammer drill, according to another aspect of the present disclosure may comprise a motor housing comprising a tube part and a bottom part. The circular saw or the grinder may comprise a brushless motor comprising a stator, which has a first contact surface, and a rotor, which is inward (disposed in the interior) of the stator and rotates. The circular saw or the grinder may comprise a tubular member made of a resin (polymer). The circular saw or the grinder may comprise an output part, such as an output shaft. The stator may comprise a stator core, which has a tube shape and has a ring-shaped second contact surface that is opposite of the first contact surface. The stator may have a plurality of coils wound on the stator core. The stator may be held by the motor housing in the state in which the first contact surface is in contact with the bottom part of the motor housing. The rotor may comprise a rotor shaft, which is supported in a rotatable manner by the motor housing. The rotor may comprise a rotor core, which is fixed to the rotor shaft. The rotor may comprise one or more permanent magnets, which is (are) supported by (in) the rotor core. The tubular member may make contact over (along) the entire circumference of the second contact surface of the stator core. The tubular member may be fixed to the motor housing by three or more screws. In this embodiment, the occurrence of noise due to stator resonance can be curtailed at a lower cost.

The screws may be disposed other than at a lower portion of the circular saw or the grinder when held in a normal attitude. In this embodiment, the lower portion of the circular saw or the grinder can be made more compact.

The tubular member may comprise a plurality of protruding parts. At each of the protruding parts, the tubular member may make contact with the second contact surface of the stator core. In this embodiment, because the components and portions of the stator other than on the stator core are disposed between the protruding parts, the stator can be made more compact.

The tubular member may have screw-hole parts, through which the screws pass. At a portion of each of the screw-hole parts, the tubular member may make contact with the second contact surface of the stator core. In this embodiment, the screw-hole parts serve both as a screw lock (fastener) and a stator-core presser, and therefore the tubular member and, in turn, the grinder can be made more compact.

The bottom part may have a vent. In this embodiment, the cooling structure of the brushless motor is provided with greater efficiency.

The bottom part may hold a bearing, which supports the rotor shaft. In this embodiment, the circular saw or the grinder can be made more compact.

The stator may comprise a terminal unit, which is (electrically) connected to each of the coils. The terminal unit may have the first contact surface. In this embodiment, the coil connection mechanism is provided with greater efficiency.

The outer diameter of the stator core may be the axial length of the stator core or greater. In this embodiment, the occurrence of noise is curtailed (reduce) more effectively.

A fan, which is rotated by the rotor, may be provided in the circular saw or the grinder. The tubular member may be a baffle plate, which rectifies a cooling air draft created by the fan. In this embodiment, the fan and the presser member for the stator is provided with greater efficiency.

The stator core may be formed by stacking ring-shaped steel sheets. In this embodiment, the number of the steel sheets overlaid (stacked) in the stator core is adjustable (changeable, variable), and thereby the stator core is provided with greater efficiency. The rotor core may be formed by stacking ring-shaped steel sheets. In this embodiment, the number of the steel sheets overlaid in the rotor core is adjustable (changeable, variable), and thereby the rotor core is provided with greater efficiency.

A method of manufacturing an electric work machine according to another aspect of the present disclosure may be a method of manufacturing a second electric work machine (e.g., a second circular saw, a second grinder, a second hammer drill, etc.), the type of which is different from a first electric work machine (e.g., a first circular saw, a first grinder, a first hammer drill, etc.) that has a stator of a brushless motor fixed by a first number of screws. In this method of manufacturing, the same stator as that of the first electric work machine may be fixed by a second number of screws, which differs from the first number of screws. In this embodiment of the present disclosure, the occurrence of noise due to stator resonance can be curtailed at a relatively low cost.

The stator may comprise a tube-shaped stator core. In this embodiment, the stator is provided with greater efficiency. The stator core may be formed by stacking ring-shaped steel sheets. In this embodiment, the number of steel sheets overlaid in the stator core is adjustable (changeable, variable), and thereby the stator core is provided with greater efficiency.

The stator may be fixed via a presser member. In this embodiment, the stator is pressed more evenly.

The stator may have a tube shape. A rotor may be provided inward in the radial direction of the stator, i.e. the rotor may be provided in the interior of the stator. A fan, which is rotated by the rotor, may be provided in the circular saw or the grinder. The presser member may be a baffle plate, which rectifies a cooling air draft created by the fan. In this embodiment, the rotor, the fan, and the stator presser member are provided with greater efficiency.

An electric work machine, such as a circular saw, a grinder, a hammer drill, etc., according to another aspect of the present disclosure may comprise: a brushless motor comprising a stator and a rotor, which is disposed inward (in the interior) of the stator; and a motor housing comprising a tube part, which houses the stator, and a bottom part. The electric work machine may comprise three or more screws. The stator may comprise a stator core, an insulator, which is supported by (on) the stator core, and one or more coils, which is (are) supported by (on) the insulator. The rotor may comprise a rotor core and one or more permanent magnets, which is (are) supported by (in) the rotor core. The maximum rotational speed of the rotor may be 14,600 rpm or higher. Each of the screws may fix the stator to the motor housing. The maximum rotational speed may be the same when the electric work machine is performing work and when not performing work (e.g., when it is idling). In the alternative, the maximum rotational speed may include a (first) maximum rotational speed when performing work and a (second) maximum rotational speed when not performing work (e.g., when idling), which differ from one another; and the (first) maximum rotational speed when performing work may be higher than the (second) maximum rotational speed when not performing work. In this embodiment, the occurrence of noise due to stator resonance is effectively curtailed at a lower cost.

An electric work machine according to another aspect of the present disclosure may comprise: a brushless motor comprising a stator and a rotor, which is disposed inward (in the interior) of the stator; and a motor housing comprising a tube part, which houses the stator, and a bottom part. The electric work machine may comprise three or more screws. The stator may comprise a stator core, an insulator, which is supported by (on) the stator core, and one or more coils, which is (are) supported by (on) the insulator. The rotor may comprise a rotor core and one or more permanent magnets, which is (are) supported by (in) the rotor core. The maximum rotational speed of the rotor may include a maximum rotational speed when performing work R and a maximum rotational speed when not performing work (R-r), which differ from one another or coincide. The maximum rotational speed when performing work R and the maximum rotational speed when not performing work (R-r) may have a relationship expressed by $(r/R) \leq 0.12$. Each of the screws may fix the stator to the motor housing. In this embodiment, the occurrence of noise due to stator resonance is curtailed effectively at a lower cost.

Embodiments of the present disclosure and modified examples thereof are explained below, with reference to the drawings where appropriate. The present disclosure is not limited to the embodiments and the modified examples.

Front, rear, up, down, left, and right in the embodiments and the modified examples are prescribed for the sake of convenience of the explanation and may change depending at least on the circumstances of the work or the movement of members.

First Embodiment

Figure 2:
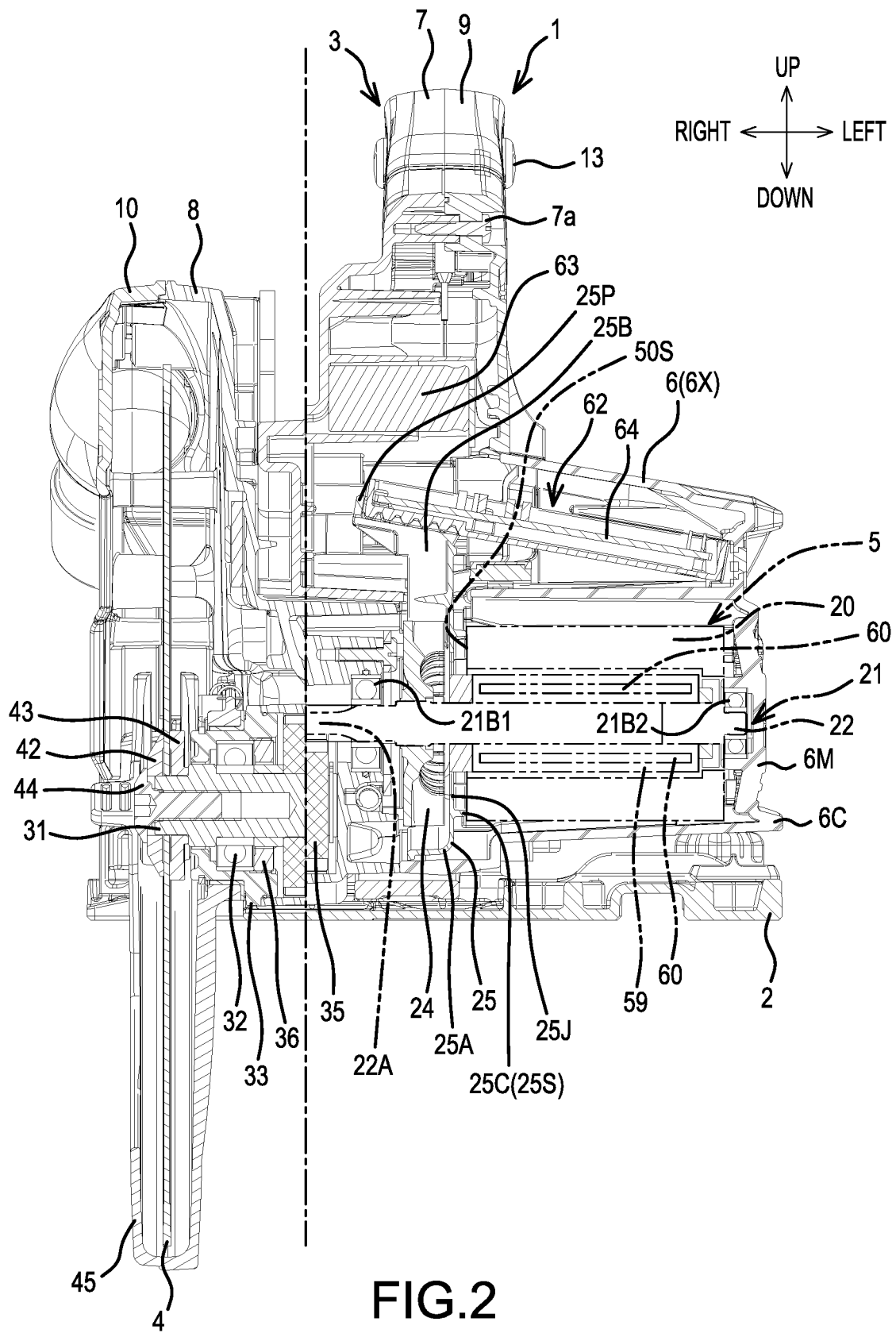
FIG. 2 is a longitudinal, cross-sectional view of center positions of a rotor shaft and an output shaft in FIG. 1 (wherein a virtual plane that passes through the center of a gear in the left-right direction relating to the output shaft serves as a boundary).

FIG. 1 is a left side view of a circular saw 1, which is one example, from among power tools that are types of electric work machines according to the present teachings, of a handheld cutting machine according to a first embodiment of the present disclosure. FIG. 2 is a longitudinal, cross-sectional view of the center positions of a rotor shaft 22 and an output shaft 31 (wherein the virtual plane through the center of a gear 35 in the left-right direction serves as a boundary) of the circular saw 1.

The circular saw 1 comprises a base 2, which has a flat-plate shape, and a housing 3, which is disposed upward of the base 2. A "circular saw" is a tool that rotates a circular saw blade. It is noted that a power cutter, which is a tool that is configured, e.g., to rotate a circular grinding wheel (diamond wheel), may have a structure the same as that of the circular saw 1 in the pertinent aspects of the present disclosure.

The housing 3 indirectly supports a saw blade 4, which serves as a tool accessory. The housing 3 holds a brushless motor 5, which rotationally drives the saw blade 4. The housing 3 comprises a motor housing 6, a main-body housing 7, and a gear housing 8.

The motor housing 6 is made of a resin (polymer) and comprises a tube part 6C and a box part 6X. The tube part 6C has a bottomed, circular-tube shape and comprises a bottom part 6M. The bottom part 6M is a left-end portion of the motor housing 6. The motor housing 6 holds the brushless motor 5 in the tube part 6C. A plurality of air-intake holes 6N serving as vents is formed in the bottom part 6M of the tube part 6C. The box part 6X has a bottomed, open-lidded, box shape, which is open rightward, and is disposed upward of the tube part 6C. It is noted that the bottom part 6M may be a separate body from the tube part 6C. In addition, the vents may be air-exhaust holes.

The main-body housing 7 is made of a resin (polymer). The main-body housing 7 is divided into left and right halves that are joined by a plurality of screws 7a in the left-right direction. An upper portion of the main-body housing 7 is a grip part 9, which has the shape of an upper-half portion of a loop.

The motor housing 6 is coupled to a left-side portion of the main-body housing 7 by a plurality of screws 6a extending in the left-right direction. The motor housing 6 has screw holes 6H, which respectively correspond to the screws 6a.

A left portion of the gear housing 8 is coupled to a lower-right portion of the main-body housing 7. A right portion of the gear housing 8 is a blade-case part 10. The blade-case part 10 covers an upper portion of the saw blade 4.

A switch (not shown), from which a trigger 12 protrudes downward, is held in the grip part 9. A lock-OFF lever 13, which extends in the left-right direction, passes through the housing 3 upward of the trigger 12. In the normal state in which the lock-OFF lever 13 is not pressed rightward or leftward, the lock-OFF lever 13 locks (prevents) the pulling of the trigger 12. When the trigger 12 is manipulated (pressed) upward in the state in which the lock-OFF lever 13 has been pressed, the switch turns ON. When the upward manipulation (pressing) of the trigger 12 is released, the switch turns OFF and the lock-OFF lever 13 returns to the normal state.

A battery-mounting part 15 is formed at a left-rear portion of the main-body housing 7. The battery-mounting part 15 is disposed rearward of the motor housing 6. One or two batteries 16, which serve as a power supply, are mounted on the battery-mounting part 15. Herein, the term "battery" is used in a synonymous manner with "battery pack" or "battery cartridge", which contains a plurality of battery cells electrically connected together. Each of the batteries 16 comprises a battery button 16A. Each of the batteries 16 is mounted by being slid rightward from the left side of the battery-mounting part 15. In addition, the mounted batteries 16 are demounted by being slid leftward while manipulating (pressing) the battery buttons 16A. It is noted that the maximum number of the batteries 16 that are mountable on the battery-mounting part 15 may be one or may be three or more. At least any one of the batteries 16 may be mounted in a manner other than being slide mounted. In addition, instead of the batteries 16 and the battery-mounting part 15, a power-supply cord that is connectable to an AC power supply (commercial power supply) may be provided.

The brushless motor 5 comprises a stator 20 and a rotor 21.

The stator 20 is held by the tube part 6C of the motor housing 6.

The rotor 21 is disposed on the inner-circumference side of the stator 20. The brushless motor 5 is an inner-rotor type.

The rotor 21 comprises the rotor shaft 22, a rotor core 59, a plurality of sensor permanent magnets (not shown), and a plurality (four) of permanent magnets 60. The rotor shaft 22 extends in the left-right direction. The rotor 21 is rotatable, centered on the rotor shaft 22, which is rotatably supported by bearings 21B1, 21B2, the latter of which is held in the bottom part 6M of the motor housing 6. The rotor shaft 22 is a rotary shaft of the brushless motor 5. A pinion part 22A is formed at a tip portion of the rotor shaft 22.

A fan 24 is fixed integrally to the rotor shaft 22. The fan 24 is a centrifugal fan. The fan 24 creates an air flow (draft) for cooling. In the left-right direction, the fan 24 is disposed between the stator 20 and the pinion part 22A. It is noted that the fan 24 may be a fan of some other type such as an axial-flow fan.

Figure 4:
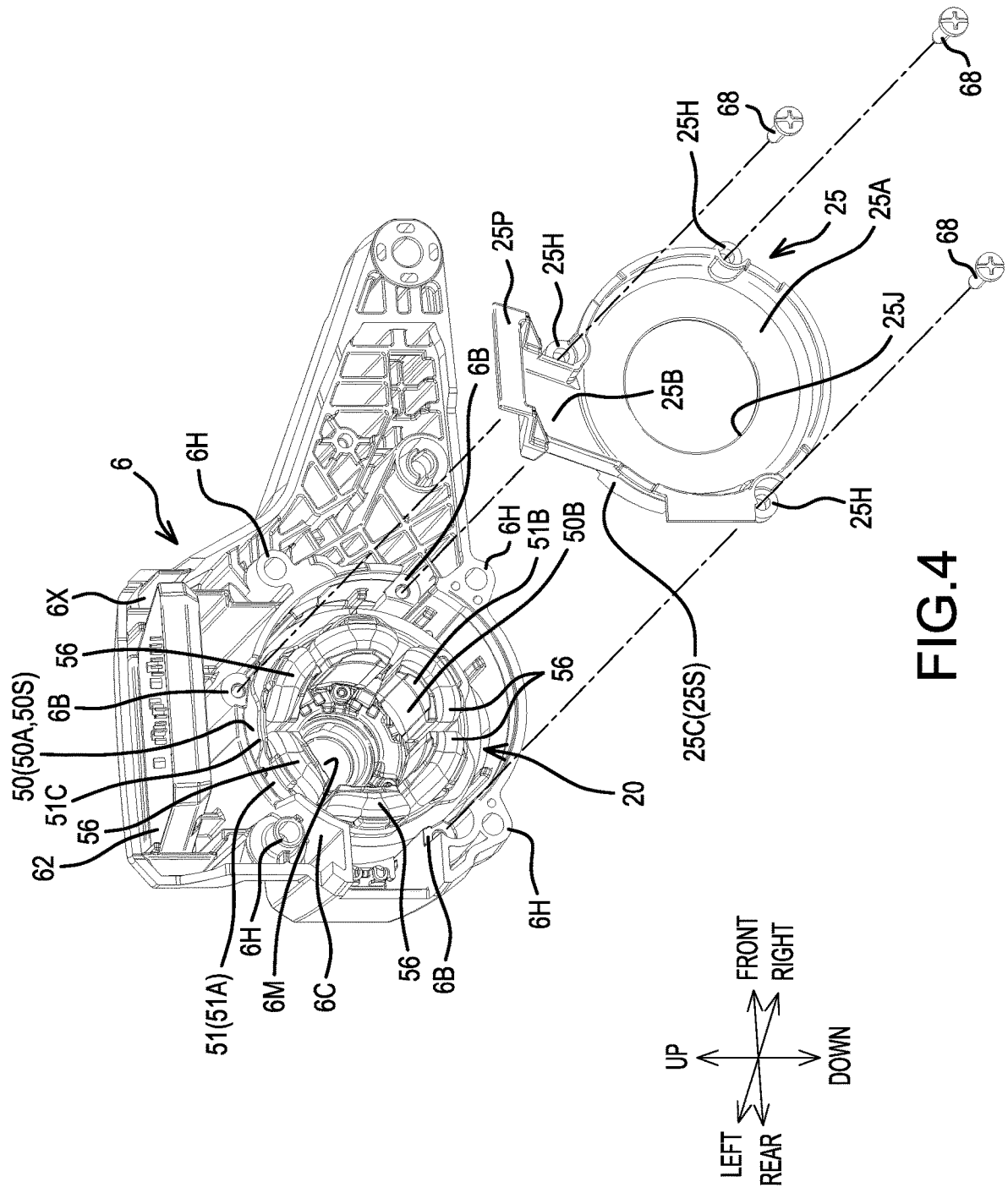
FIG. 4 is a partial, exploded, oblique view of FIG. 3.

As can be seen in FIGS. 2 and 4, a baffle plate 25, which serves as a tubular member and a presser member, is provided on the left side of the fan 24. The baffle plate 25 is made of a resin (polymer). The baffle plate 25 is fixed to the motor housing 6. In the left-right direction, the baffle plate 25 and the fan 24 are disposed between the motor housing 6 and the gear housing 8.

The baffle plate 25 comprises a dish part 25A, an extension part 25B, and a tubular part 25C.

The dish part 25A has a dish shape and is adjacent to the fan 24. The dish part 25A adjusts the direction of the cooling air draft of the fan 24. The dish part 25A rectifies the draft generated by the fan 24. A hole 25J is formed in the center portion of the dish part 25A. The rotor shaft 22 passes through the interior of the hole 25J. The pinion part 22A is contained within the gear housing 8.

The extension part 25B extends, in series with the dish part 25A, upward from an upper portion of the dish part 25A. A protruding part 25P is formed on an upper-end portion of the extension part 25B and protrudes rightward from an adjacent portion.

The tubular part 25C is disposed on the left side of the dish part 25A. The tubular part 25C protrudes in a circular-tube shape from a left surface of the dish part 25A. The tubular part 25C has a plurality of protruding parts 25S. The protruding parts 25S are disposed on left-end (left side) portions of the baffle plate 25. Each of the protruding parts 25S protrudes leftward from an adjacent portion. Each of the protruding parts 25S presses the stator 20, which is inside the motor housing 6, leftward. The stator 20 is interposed between the baffle plate 25 and the bottom part 6M of the motor housing 6.

The brushless motor 5 (the stator 20), the motor housing 6, and the baffle plate 25 are described in detail below.

As shown in FIG. 2, the output shaft 31, which serves as the output part, is provided rightward of the rotor shaft 22. The output shaft 31 extends in the left-right direction. A right-side (rightward) portion of the output shaft 31 is supported by a bearing 32. The bearing 32 is held by a bearing retainer 33. The bearing retainer 33 has a tubular portion. The bearing 32 is disposed within the tubular portion of the bearing retainer 33. The left-end portion of the output shaft 31 is supported by a bearing (not shown), which is held by the gear housing 8.

The gear 35 is fixed integrally to a left portion of the output shaft 31. The gear 35 meshes with the pinion part 22A of the rotor shaft 22. The diameter of the pinion part 22A is smaller than the diameter of the gear 35. The tooth count of the pinion part 22A is smaller (less) than the tooth count of the gear 35. The pinion part 22A is disposed rearward and downward of the uppermost portion of the gear 35.

A ring 36 is provided leftward of the bearing 32. The ring 36 is held by the bearing retainer 33. The ring 36 receives the thrust load of the bearing 32.

A saw blade 4 is fixed to a right-end portion of the output shaft 31. In the state in which the saw blade 4 is sandwiched by an outer flange 42 and an inner flange 43, the saw blade 4 is fixed by screwing a bolt 44 in the left-right direction into the axial center of the output shaft 31 from the right. It is noted that the output shaft 31, the outer flange 42, the inner flange 43, and the bolt 44 constitute a tool-accessory retaining portion.

A safety cover 45 is disposed in the interior of the gear housing 8. In the normal state, the safety cover 45 covers the lower side of the saw blade 4. The safety cover 45 is mounted on the gear housing 8 in a rotatable manner. The safety cover 45 is rotationally biased toward a normal state position.

An operating example of the circular saw 1 configured in this manner will now be explained.

The following setup is performed by a user. That is, the safety cover 45 is rotated from the normal position to the position at which the safety cover 45 is housed in the blade-case part 10 of the gear housing 8. In addition, charged batteries 16 are mounted on the battery-mounting part 15.

Then, when the trigger 12 is pulled upward by the user, the switch turns ON, the brushless motor 5 is driven, and the rotor 21 rotates.

Owing to the rotation of the rotor 21, the rotor shaft 22 rotates and the output shaft 31 is rotated at a speed that is reduced via the pinion part 22A and the gear 35. Thereby, the saw blade 4, which is mounted on the output shaft 31, rotates. Accordingly, the circular saw 1 can cut a workpiece.

In addition, after cooling air, which has been sucked in via the air-intake holes 6N owing to the rotation of the fan 24 attendant with the rotation of the rotor shaft 22, has passed through the brushless motor 5 and cooled the brushless motor 5, the cooling air is supplied to the main-body housing 7 side and the gear housing 8 side by the baffle plate 25.

The brushless motor 5 (the stator 20), the motor housing 6, and the baffle plate 25 are described in detail below.

Figure 3:
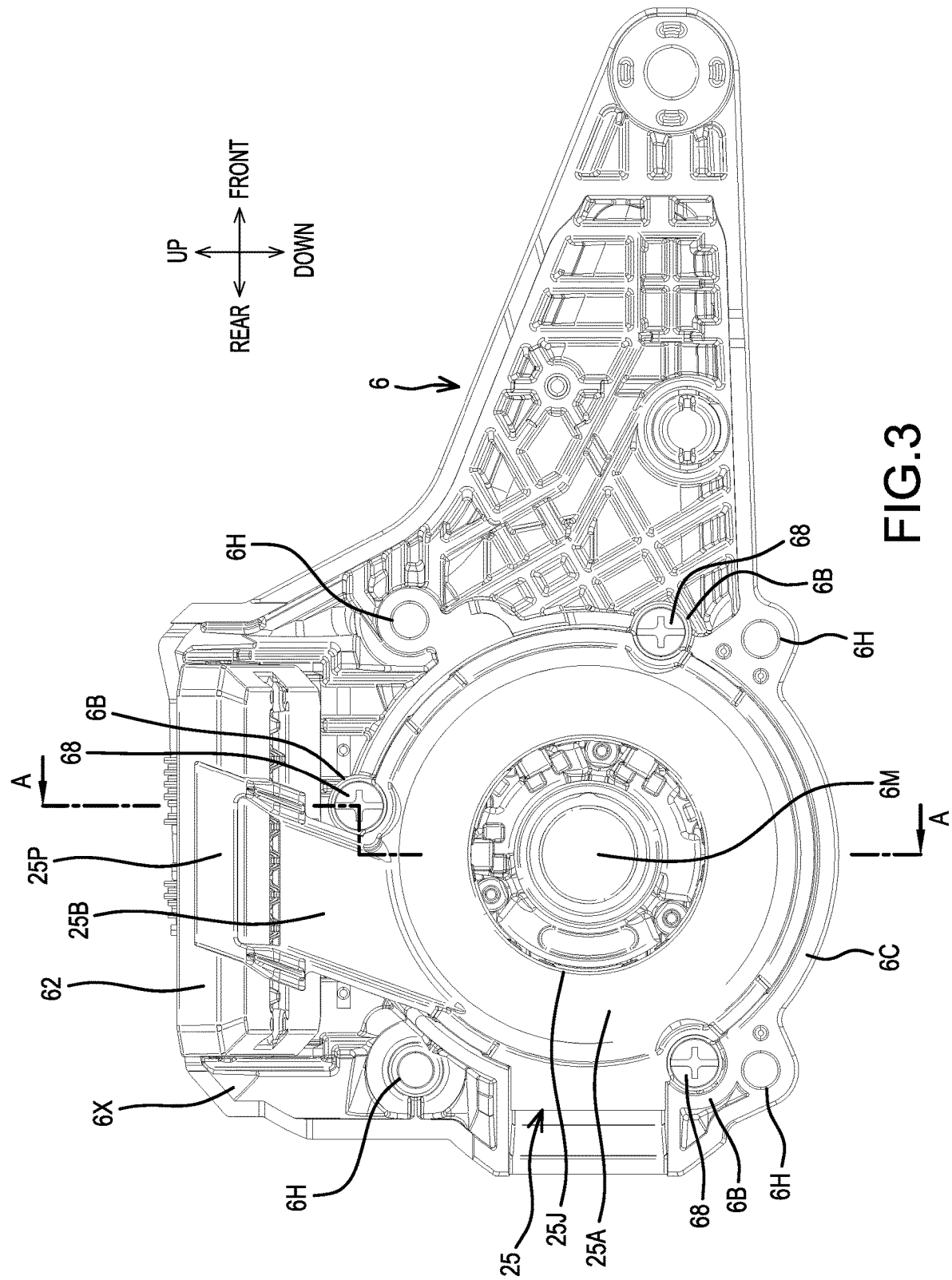
FIG. 3 is a right side view of a motor housing, including a stator and a baffle plate, in FIG. 1.
Figure 5:
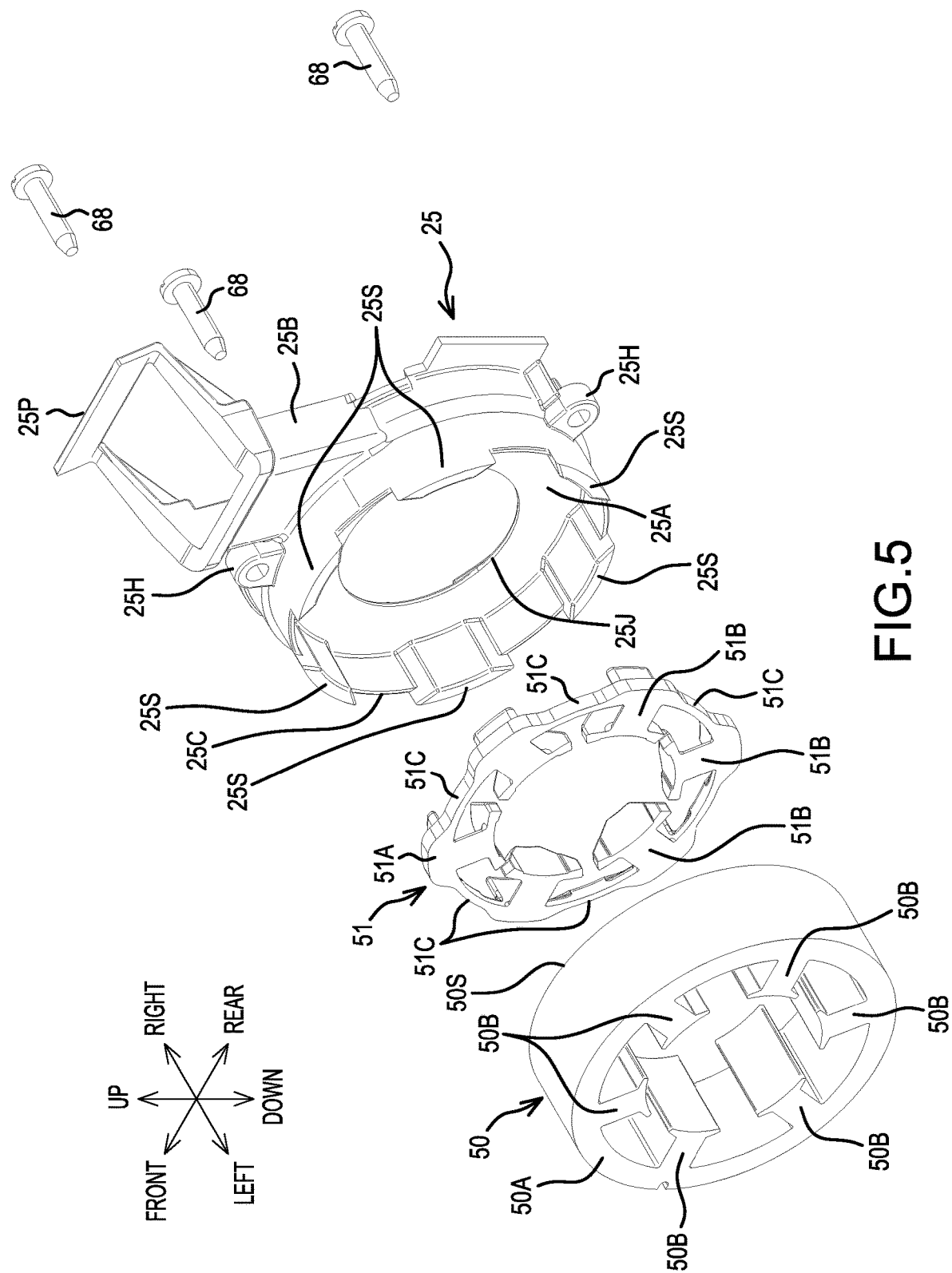
FIG. 5 is an exploded, oblique view of screws, the baffle plate, a first insulator, and a stator core in FIG. 3.
Figure 6:
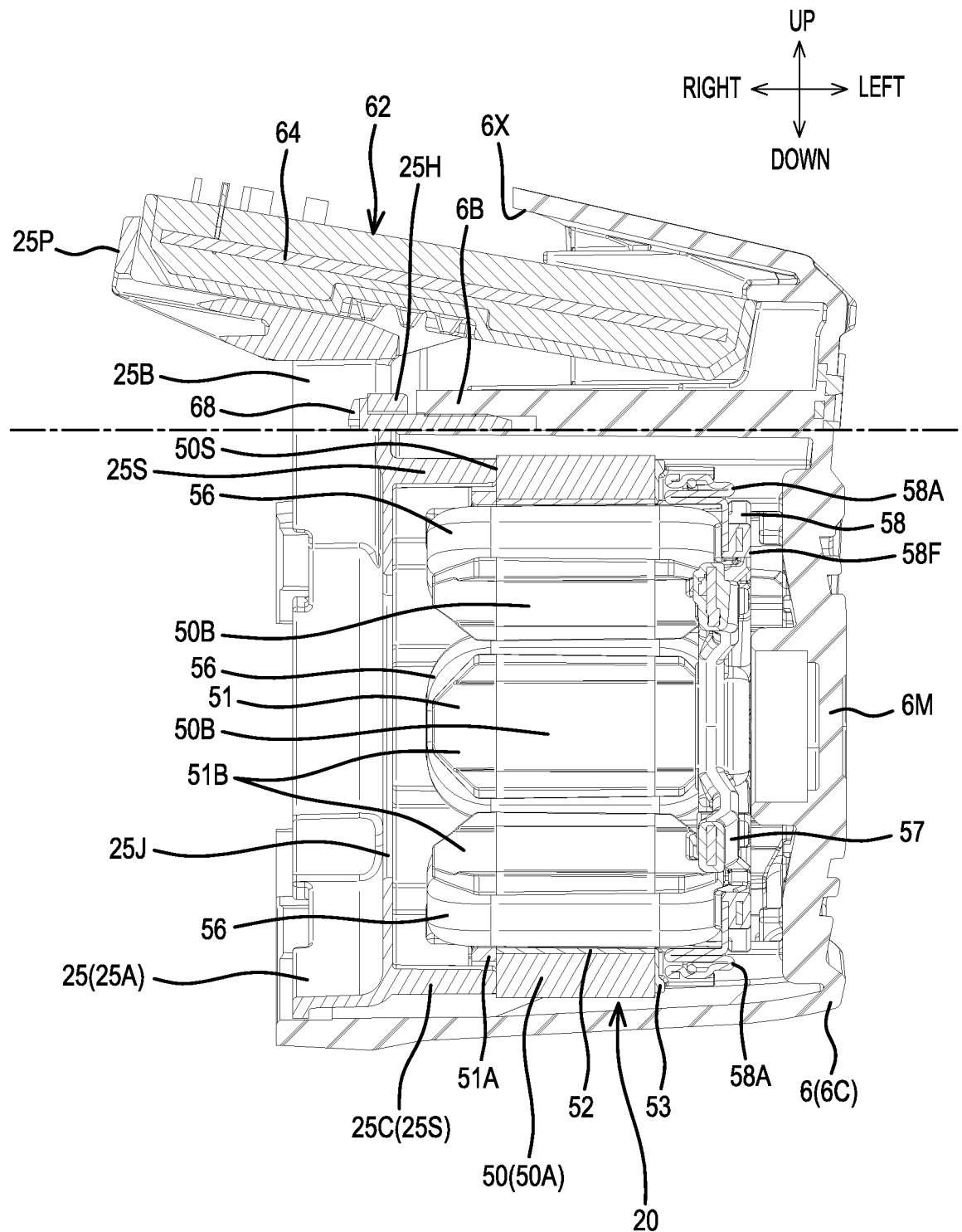
FIG. 6 is a cross-sectional view taken along line A-A in FIG. 3.

FIG. 3 is a side view of the motor housing 6, including the stator 20 and the baffle plate 25. FIG. 4 is a partial, exploded, oblique view of FIG. 3. FIG. 5 is an exploded, oblique view of screws 68, the baffle plate 25, a first insulator 51, and a stator core 50. FIG. 6 is a cross-sectional view taken along line A-A in FIG. 3.

The stator 20 of the brushless motor 5 comprises the stator core 50, the first insulator 51, a plurality (six) of second insulators 52, a third insulator 53, a plurality (six) of coils 56, a sensor board 57, and a terminal unit 58.

The stator core 50 is constituted by stacking a plurality of ring-shaped steel sheets. The stator core 50 has a circular-tube-shaped stator-core main body 50A and a plurality of teeth 50B. Each of the teeth 50B protrudes inward in the radial direction from an inner surface of the stator-core main body 50A.

The right-side surface of the stator core 50 is a second contact surface 50S. The second contact surface 50S has a ring shape.

The first insulator 51 is an insulating member and is in contact with the right side of the stator core 50.

Each of the second insulators 52 is an insulating member. The second insulators 52 are respectively disposed between adjacent ones of the teeth 50B in the circumferential direction.

The third insulator 53 is an insulating member and is in contact with the left side of the stator core 50.

Each of the coils 56 is wound on the first insulator 51, the second insulators 52, and the third insulator 53 and around the corresponding tooth 50B.

The number of the coils 56 is called the "slot count".

It is noted that the second insulators 52 and at least one of the first insulator 51 and the third insulator 53 may be integrally formed.

The sensor board 57 has a ring shape and is fixed to a left-end (left-side) portion of the stator-core main body 50A. The sensor board 57 is adjacent to the left side of the third insulator 53. The sensor board 57 is equipped with a plurality (two) of rotation-detection devices (not shown). The rotation-detection devices detect the locations of the sensor permanent magnets and output rotation-detection signals. The sensor permanent magnets are provided on and/or in the rotor core 59.

The rotor core 59 has a circular-tube shape. The rotor core 59 is formed by stacking ring-shaped steel sheets. The rotor core 59 is disposed around the rotor shaft 22. The rotor core 59 is integrally fixed to the rotor shaft 22. The rotor core 59 supports a plurality (four) of the plate-shaped permanent magnets 60 (refer to FIG. 2). The permanent magnets 60 are respectively located on four side surfaces, which are each a virtual rectangular parallelepiped. The virtual rectangular parallelepipeds extend in the left-right direction and are concentric with the rotor shaft 22.

The terminal unit 58 has a ring shape. The terminal unit 58 is fixed to a left-end portion of the stator-core main body 50A. The terminal unit 58 is disposed outward in the radial direction of the sensor board 57. The terminal unit 58 electrically connects, in a prescribed manner, the coils 56. The terminal unit 58 has a plurality (six) of fusing terminals 58A. Each of the fusing terminals 58A is connected to a respective (corresponding) crossover wire that is disposed between (electrically connects) corresponding coils 56. A left surface of the terminal unit 58 is a first contact surface 58F, which is opposite of the second contact surface 50S. The first contact surface 58F makes contact with the bottom part 6M of the motor housing 6.

A controller 62 is held by the box part 6X of the motor housing 6. A right-side portion of the controller 62 projects rightward beyond the right end of the box part 6X. The right-side (rightward) portion of the controller 62 is held by the protruding part 25P of the baffle plate 25. An electrolytic capacitor 63 (see FIG. 2) is disposed upward of the controller 62. The electrolytic capacitor 63 is held by the main-body housing 7. The electrolytic capacitor 63 serves as a smoothing capacitor.

The controller 62 comprises a control circuit board 64. The control circuit board 64 is equipped with a microcontroller, diodes, switching devices, etc. In addition, the control circuit board 64 is electrically connected to the electrolytic capacitor 63 by a lead wire (not shown). The control circuit board 64 comprises a rectification circuit and an inverter circuit. Furthermore, the control circuit board 64 is electrically connected to the sensor board 57 by a lead wire (not shown).

The microcontroller of the control circuit board 64 acquires the rotational state of the rotor 21 by acquiring the rotation-detection signals, which indicate the locations of the sensor permanent magnets of the rotor 21, output from the rotation-detection devices of the sensor board 57. In addition, the microcontroller of the control circuit board 64 supplies electric current to each of the coils 56 of the stator 20, in order, by controlling the ON/OFF state of the each of the switching devices in accordance with the acquired rotational state, and thereby causes the rotor 21 to rotate. The electric current supplied to each of the coils 56 is rectified by the controller 62. The magnetic field generated by each of the coils 56 acts on the permanent magnets 60 of the rotor 21.

The stator 20 is contained in the tube part 6C of the motor housing 6. The tube part 6C has a plurality (three) of screw-boss parts 6B. The three screw-boss parts 6B are disposed on (at) an upper portion, a lower-front portion, and a lower-rear portion of the tube part 6C. Thereby, the lower portion of the motor housing 6 does not project beyond the screw-boss parts 6B and the screws 68 described below. That is, the screw-boss parts 6B and the screws 68 described below are disposed other than at the lower portion of the circular saw 1 when held in its normal attitude. (Herein, the term "normal attitude" is intended to mean that the electric work machine is held in an orientation that is most appropriate for typical usage. For example, for a circular saw, the "normal attitude" means that the base 2 is horizontal to a surface of the workpiece to be cut and/or to the ground/floor.) Accordingly, the maximum thickness of the workpiece that can be cut by the saw blade 4 becomes even larger (may be increased).

That is, in a conventional embodiment in which the screw-boss parts 6B were to be disposed at the lower portion of the tube part 6C (unlike the circular saw 1 shown in FIG. 2, etc.), the tube part 6C would have to be disposed upward of the circular saw 1 in FIG. 2 to avoid interference between the base 2 and the screw-boss parts 6B at the lower portion of the tube part 6C. In so doing, the rotor shaft 22 of the brushless motor 5 disposed inside the tube part 6C would also have to be disposed upward of the circular saw 1 in FIG. 2. Furthermore, the output shaft 31, which is connected to the rotor shaft 22, and the saw blade 4, which is mounted thereon, would also have to be disposed upward of the circular saw 1 in FIG. 2. Thus, in such a conventional embodiment in which the screw-boss parts 6B are disposed at the lower portion of the tube part 6C, the height of the protrusion from the base 2 of the saw blade 4 (i.e., the size of the protrusion in the up-down direction) would decrease commensurate with the extent that the saw blade 4 is disposed upward. Thereby, in such a conventional embodiment, the maximum thickness of the workpiece that can be cut by the saw blade 4 becomes smaller than the maximum thickness that can be cut by the circular saw 1. In contrast to such a conventional embodiment, the circular saw 1 of the present disclosure enables the maximum thickness of the workpiece that can be cut by the saw blade 4 to become larger owing to the fact that no screw-boss part 6B is disposed at (along) the lower portion of the tube part 6C.

The baffle plate 25 has a plurality (three) of screw-hole parts 25H at the circumferential edge of the dish part 25A. The arrangement of the screw-hole parts 25H, viewed leftward from the right side of the baffle plate 25, coincides with the arrangement of the screw-boss parts 6B of the motor housing 6.

The first insulator 51 comprises a ring-shaped first insulator main body 51A and a plurality (six) of first tooth covering parts 51B. The first insulator main body 51A comprises a plurality (six) of recessed parts 51C, which are recessed inward in the radial direction from adjacent portions (circumferentially-adjacent surfaces). The recessed parts 51C are respectively disposed between adjacent ones of the first tooth covering parts 51B in the circumferential direction.

The baffle plate 25 is screw-fastened to the tube part 6C in the state in which the baffle plate 25 is in contact with the stator 20. That is, a plurality (three; the first number) of the screw-boss parts 6B and a plurality (three; the first number) of the screws 68, which respectively pass through the corresponding screw-hole parts 25H, are provided and extend in the left-right direction of the circular saw 1. As can be seen in FIGS. 4 and 5, one of the screws 68 (namely, the screw 68 adjacent to protruding part 25P) is disposed above the other screws 68 in the up-down direction.

Each of the protruding parts 25S of the baffle plate 25 is disposed outward in the radial direction of the corresponding recessed part 51C of the first insulator 51. The protruding parts 25S and the screw-hole parts are circumferentially distributed around the tubular member. Each protruding part 25S has an arc shape. The protruding parts 25S make contact with the second contact surface 50S of the stator-core main body 50A. All of the protruding parts 25S make contact with the ring-shaped second contact surface 50S around the outer circumference of the stator 20. Each of the protruding parts 25S presses the stator core 50 leftward. The stator 20 is supported by the bottom part 6M of the motor housing 6 at the first contact surface 58F. It is noted that, instead of the terminal unit 58 or together with the terminal unit 58, the first contact surface, which is the surface by which the stator 20 is supported by the motor housing 6, may be provided at one or more other portions of the stator 20. For example, the first contact surface may be provided on the stator core 50.

The pushing force (load) of the baffle plate 25 against the stator core 50 due to the three screws 68 increases monotonically with the number of the screws 68.

In an embodiment in which the rotational frequency of the rotor 21 or a higher harmonic component (Hz: Hertz) thereof and the resonant frequency (Hz) of the stator 20 coincide, the stator 20 will resonate. Then, the resonance of the stator 20 generates a sound that can be heard by the user of the circular saw 1.

One example of a mode of vibration due to resonance of the stator 20 is an annular mode, which is principally in the radial direction. Vibration in the annular mode includes elliptical deformation (annular second order), triangular deformation (annular third order), square deformation (annular fourth order), etc. In addition, in an embodiment in which the thickness of the stator 20 (size or dimension in the left-right direction in the first embodiment) is less than a prescribed value, then the stator 20 vibrates as deformation such that the stator 20 deflects also in the axial direction.

During such vibration, if the portion of the stator 20 that deforms in the axial direction is subjected to a load externally in the axial direction, then the stator 20 is constrained in the axial direction. Thereby, the stiffness of the stator 20 increases. Accordingly, the resonant frequency of the stator 20 increases beyond the situation in which there is no load. In addition, when the magnitude of the load imparted to the stator 20 increases, the stiffness of the stator 20 further increases. Thereby, the resonant frequency of the stator 20 further increases. Accordingly, the resonant frequency of the stator 20 is changed by the change in the magnitude of the load on the stator 20. The resonant frequency of the stator 20 increases monotonically with increases in the magnitude of the load on the stator 20.

Here, the rotational frequency of the rotor 21 and the higher harmonic component thereof, the resonant frequency of the stator 20, and the like are further described in detail. That is, with every rotation of the rotor 21, the stator 20 is subjected to magnetic field changes caused by the permanent magnets 60 commensurate with (in proportion to) the number (four) of permanent magnets 60. The number of permanent magnets 60 is called the "pole count". Consequently, the stator 20 vibrates at a frequency calculated by multiplying the rotational frequency by the pole count, that is, at a fourth-order harmonic component in the case of the brushless motor 5.

In addition, generally, compared with rotational frequency (Hz), rpm (rotations per minute) is widely used as the notation of the rotational speed of the rotor 21. On the other hand, a user having typical hearing ability hears sounds in the frequency range of 1,600 Hz or higher and 4,000 Hz or lower and adjacent ranges thereof. Within the above-mentioned frequency range, sound in the frequency range of 2,000 Hz or higher and 3,150 Hz or lower is particularly heard. In addition, the brushless motor 5 (the rotor 21) of the present embodiment can rotate at 30,000 rpm.

Accordingly, in an embodiment in which the resonant frequency of the stator 20 is 2,000 Hz for a rotor 21 that rotates at 30,000 rpm (500 Hz), because the vibration at 2,000 Hz, which is calculated by multiplying the rotational frequency by the pole count (four), is amplified by the resonance, and in turn the sound is also amplified, it becomes hearable by the user. In addition, although different from the brushless motor 5 described above, brushless motors that have twice the pole count and can rotate at 80,000 rpm (approximately 1,333 Hz) are becoming commercially available. In such a brushless motor, in an embodiment in which the resonance of the stator 20 coincides with the rotational frequency of the rotor 21, sound that falls in the adjacent range described above is generated not at the higher harmonic component but even at the rotational frequency itself.

In an embodiment in which vibration or noise of a prescribed extent or more is not generated in the circular saw 1 (first electric work machine) described above, when a circular saw (second electric work machine) of a different type having a different rotational speed and the like and that is used principally in the brushless motor 5 is designed or prototyped for common use as the brushless motor 5 and when vibration or noise of the prescribed extent or more is generated due to resonance of the stator 20, the vibration or noise in the second electric work machine can be reduced by changing the resonant frequency of the stator 20. For example, when the rotational speed that is principally used in the circular saw 1 is 20,000 rpm, if a circular saw of a different type, in which the rotational speed principally used is 36,000 rpm, is designed or prototyped for common use as the brushless motor 5, when vibration or noise of the prescribed extent or more is generated due to resonance of the stator 20, the vibration or noise in the second electric work machine is reduced by changing the resonant frequency of the stator 20.

As described above, the change in the resonant frequency of the stator 20 is accomplished (achieved) by changing the axial load on the stator 20. More specifically, in the first embodiment, the change in the axial load on the stator 20 is accomplished (achieved) by changing the number of the screws 68 for connecting the baffle plate 25 and the motor housing 6. For example, the number of the screws 68 is modified (increased) from three (first number) in the first electric work machine to five (second number) in the second electric work machine, thereby changing (increasing) the axial load on the stator 20 of the second electric work machine, with the proviso that the tightening torque applied to the screws 68 is the same in the first and second electric work machines.

Figure 7:
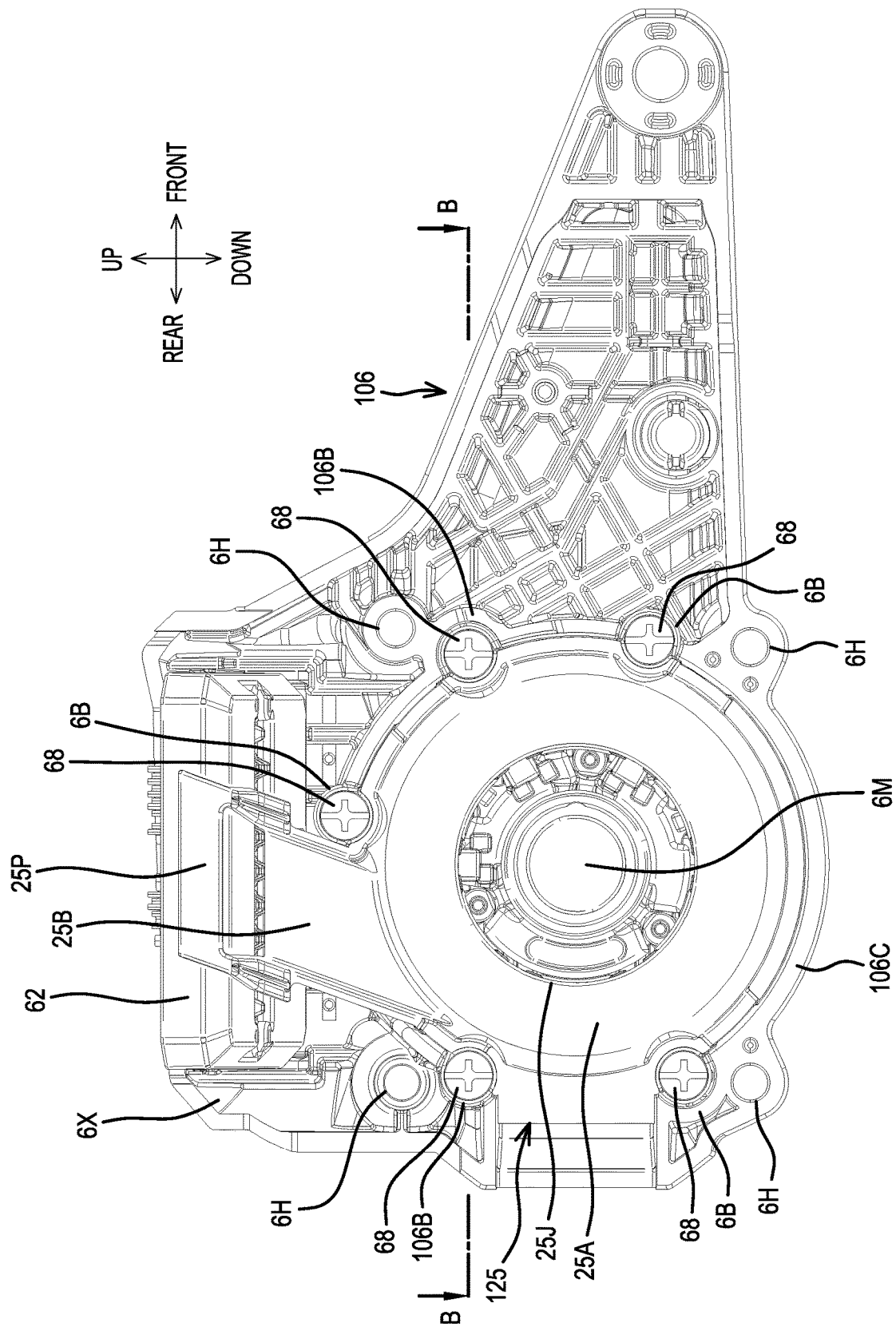
FIG. 7 is a right side view of the motor housing, including the stator and the baffle plate, in an embodiment in which the number of screws for mounting the baffle plate is five.
Figure 8:
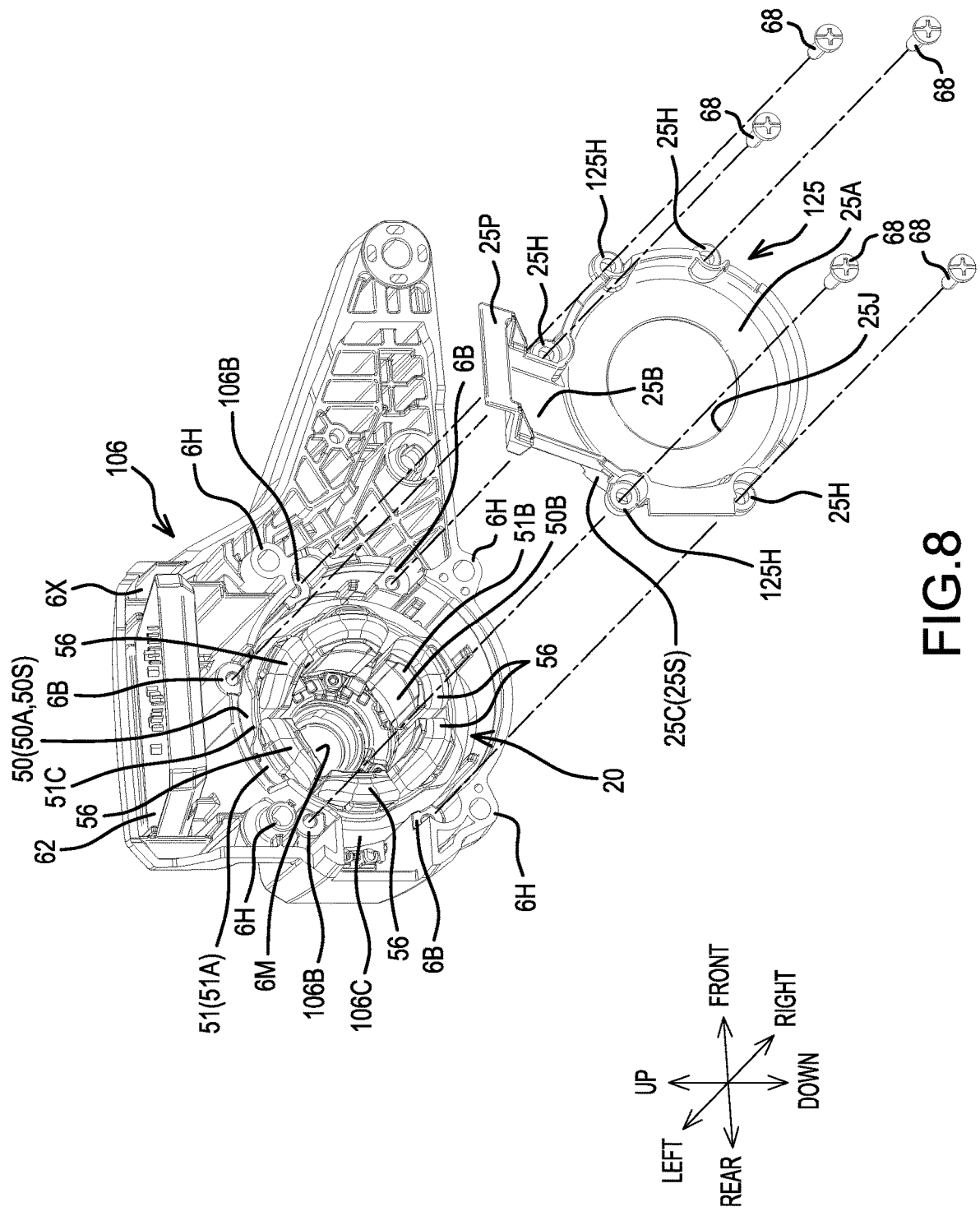
FIG. 8 is a partial, exploded, oblique view of FIG. 7.
Figure 9:
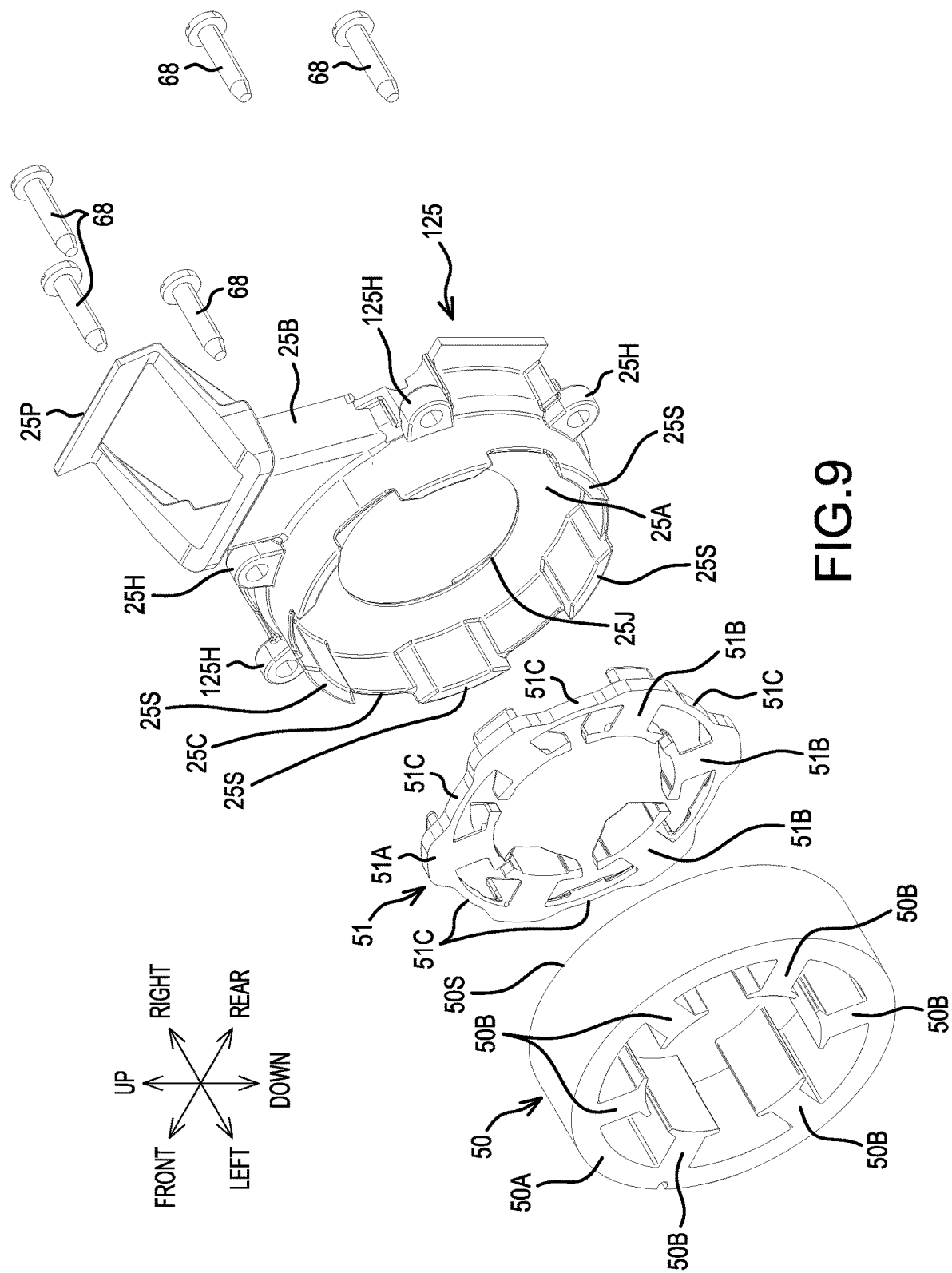
FIG. 9 is an exploded, oblique view of the screws, the baffle plate, the first insulator, and the stator core in FIG. 7.
Figure 10:
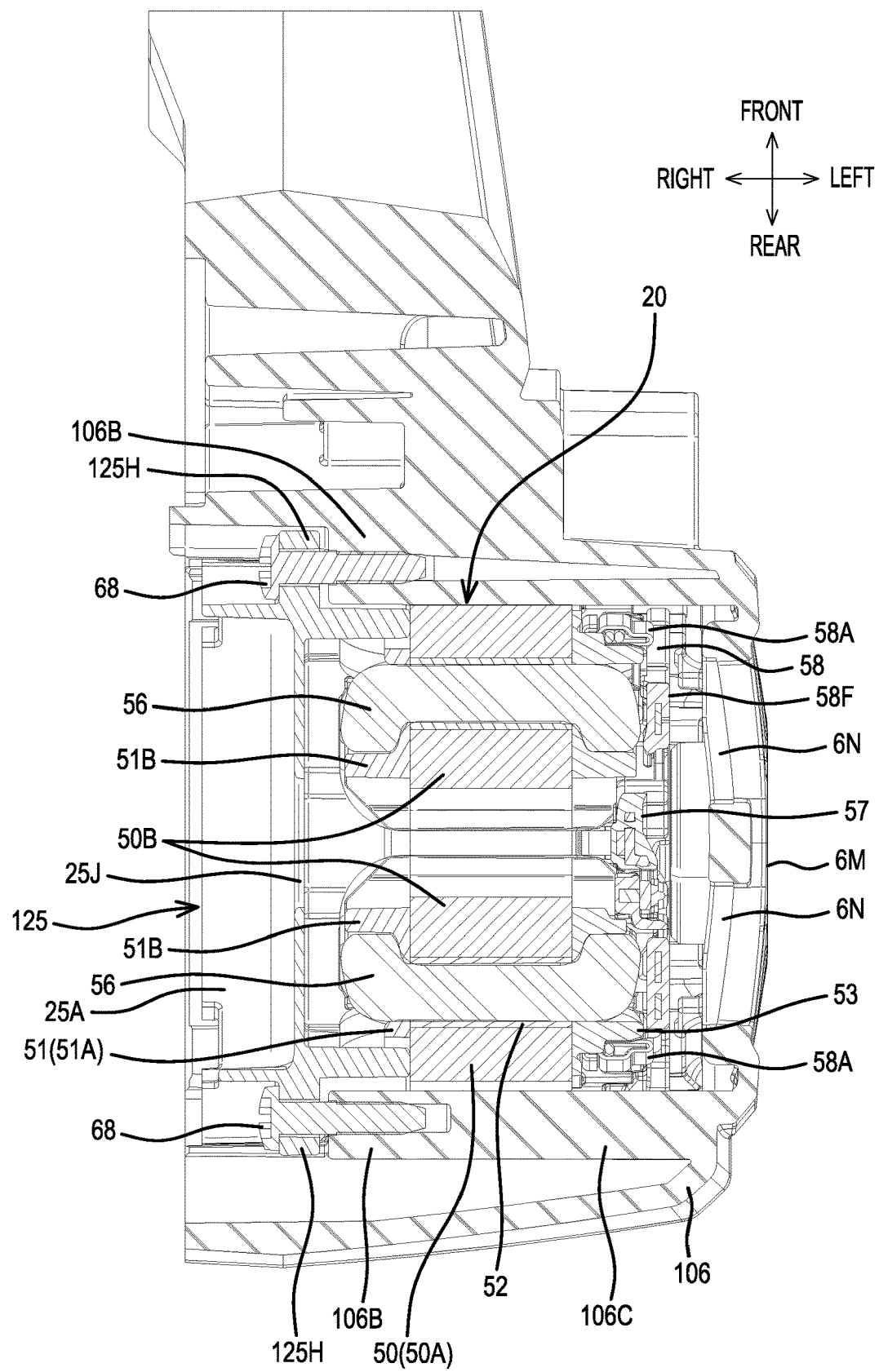
FIG. 10 is a cross-sectional view taken along line B-B in FIG. 7.

FIG. 7 is a right side view of a motor housing 106, including the stator 20 and a baffle plate 125, of a circular saw (second electric work machine) for an embodiment in which there are five of the screws 68. FIG. 8 is a partial, exploded, oblique view of FIG. 7. FIG. 9 is an exploded, oblique view of the screws 68, the baffle plate 125, the first insulator 51, and the stator core 50. FIG. 10 is a cross-sectional view taken along line B-B in FIG. 7.

Below, members and portions that are the same as those for the above-described embodiment in which there are three of the screws 68 are assigned the same symbols, and explanations thereof are omitted where appropriate.

A tube part 106C of the motor housing 106 comprises two additional screw-boss parts 106B, i.e. in addition to the three screw-boss parts 6B. In the circumferential direction of the tube part 106C, the front screw-boss part 106B is disposed between the upper screw-boss part 6B and the lower-front screw-boss part 6B. In the circumferential direction of the tube part 106C, the rear screw-boss part 106B is disposed between the upper screw-boss part 6B and the lower-rear screw-boss part 6B. Thereby, the lower portion of the motor housing 6 does not project beyond the screw-boss parts 6B, 106B. That is, the screw-boss parts 6B, 106B and the screws 68 are disposed other than at (or along) the lower portion of the circular saw 1 when held in the normal attitude. Accordingly, the maximum thickness of the workpiece that can be cut by the saw blade 4 becomes larger.

The baffle plate 125 comprises two additional screw-hole parts 125H, i.e. in addition to the three screw-hole parts 25H. When viewed leftward from the right side, the arrangement (location) of the two screw-hole parts 125H corresponds to the arrangement of the two screw-boss parts 106B.

In the state in which the baffle plate 125 is in contact with the stator 20, the baffle plate 125 is screw-fastened to the tube part 106C. That is, a total of five of the screws 68, which respectively pass through the screw-boss parts 6B, 106B and the corresponding screw-hole parts 25H, 125H, is provided.

Each of the protruding parts 25S of the baffle plate 125 is disposed outward in the radial direction of the corresponding recessed part 51C of the first insulator 51. The protruding parts 25S make contact with the second contact surface 50S. All the protruding parts 25S make contact with the ring-shaped second contact surface 50S around (along) its entire circumference. The protruding parts 25S press the stator-core main body 50A leftward. The stator 20 is supported by the bottom part 6M of the motor housing 6 at the first contact surface 58F.

The load imparted to the stator core 50 of the baffle plate 125 due to the five screws 68 is greater than in the above-described embodiment in which there are three of the screws 68. Thereby, the resonant frequency of the stator 20 is greater than in the embodiment in which there are three of the screws 68. Accordingly, the vibration and noise in the embodiment in which there are three of the screws 68 is decreased by the stator 20 being pressed by the baffle plate 125, which is attached (affixed) by the five screws 68.

Such a reduction in vibration and noise can be accomplished not by modifying the type (specifications) and/or design of the brushless motor 5 but rather by simply changing the number of screws 68 for affixing the baffle plate 25, 125, which presses the stator 20. Thereby, if the second electric work machine (a circular saw having five of the screws 68) is manufactured using the stator 20 of the brushless motor 5 of the first electric work machine (a circular saw 1 having three of the screws 68), a reduction of noise can be accomplished simply by modifying the number of the screws 68 for affixing the stator 20. Furthermore, the same type of the brushless motor 5 can be used in a variety of circular saws 1, including the first electric work machine and the second electric work machine, while still reducing vibration and noise merely by modifying the number of screws 68 as appropriate (i.e. in accordance with the teachings above). Accordingly, cost is decreased.

In addition, such a reduction in vibration and noise can be accomplished not by modifying the material (Young's modulus) of the baffle plate 25, 125 but by modifying the number of the screws 68 for affixing the baffle plate 25, 125, which presses the stator 20. Thereby, the cost for reducing vibration and thus noise is reduced.

In the first embodiment, as described above, by increasing the number of screws 68, the load on the stator 20 is increased and, in turn, the stiffness of the stator 20 is increased, and thereby the resonant frequency of the stator 20 can be changed. Consequently, the resonant frequency of the stator 20 can be changed much more easily in a stator 20 whose stiffness is comparatively small than in a stator 20 whose stiffness is originally sufficiently large.

For example, in the situation is which the condition of the following Equation (1) is satisfied, the resonant frequency of the stator 20 is more effectively changed. In Equation (1), 1 is the outer diameter of the stator core 50, which has a circular-tube shape. In addition, T is the thickness (depth) of the stator core 50 (the size in the left-right direction in the first embodiment), i.e. the axial length of the stator core 50.

$$\Phi \geq T \quad (1)$$

Furthermore, the smaller T is relative to $\Phi$, the more effectively that the resonant frequency of the stator 20 can be changed.

It is noted that the first embodiment is not limited to the above-mentioned embodiments and modified examples; for example, one or more of the following modifications can be further effected as appropriate.

The number of screws 68 may be three or more and may be four or six or more. In addition, the number of screws 68 may be two or less.

In the motor housing 106 having a total of five of the screw-boss parts 6B, 106B, the load on the stator 20 may be increased/decreased by setting the number of screws 68 included to three, four, or five.

With regard to the baffle plates 25, 125, the tubular part 25C may be separated from other portions. The tubular member, which is the member that presses the stator 20, may be something other than the baffle plate 25.

If the same type of the brushless motor 5 is used in a circular saw 1 (the first electric work machine) and a product (the second electric work machine) other than a circular saw 1, the reduction of vibration and noise in the product other than the circular saw 1 may be achieved by adjusting (changing) the number of screws 68. If the same type of the brushless motor 5 is used in the product (first electric work machine) other than a circular saw 1 and a product (second electric work machine) other than the circular saw 1, the reduction of vibration and noise in the product (second electric work machine) other than the circular saw 1 may be achieved by adjusting (changing) the number of screws 68.

The number of permanent magnets 60 (the pole count of the rotor 21) or the number of coils 56 in the brushless motor 5 may be increased/decreased beyond that described above. For example, the number of permanent magnets 60 may be six. In addition, the number of layers stacked in the stator core 50 can be set as appropriate.

The speed-reducing mechanism that reduces the rotational speed of the rotor shaft 22 to that of the output shaft 31 in the circular saw 1 may be substituted by some other speed-reducing mechanism, such as a planetary-gear, speed-reducing mechanism, or two or more speed-reducing mechanisms (gear stages) may be used in parallel or in series.

The circular saw 1 may have a power-supply cord instead of the battery-mounting part 15 and may be powered by a commercial power supply. With regard to the brushless motor 5, any one of the microcontroller and the switching devices may be installed on the sensor board 57. The materials of at least any one of the various cases and housings may be modified to a resin (polymer), a metal, a composite thereof, etc. The metal may be an aluminum alloy, a magnesium alloy, or some other metal. The sections of the housing 3 may be changed from that described above. In addition, at least any one of the various members, the number of the portions, the presence/absence of the installation, the material, the arrangement, the structure, and the type may be changed as appropriate.

Furthermore, the first embodiment and the modified examples thereof may be applied to: a handheld cutting machine, such as a circular saw of a type other than one in which the saw blade 4 is disposed on the left side, or a cutting machine other than a circular saw; a cutting machine or some other power tool that is not handheld; some other electric work machine; or the like. For example, the first embodiment and the modified examples thereof can be adapted to high-power products and can also be adapted to: power tools, such as angle drills, hammers, hammer drills, reciprocating saws, and grinders; gardening tools, such as chain saws, hedge trimmers, blowers, lawn mowers, mowing machines, hedge clippers, and cleaners; and air compressors for pneumatic tools, which are powered by air. As with air compressors for pneumatic tools, electrically driven equipment for operating work machines that perform work are included in the electric work machines according to the present teachings.

Second Embodiment

Figure 11:
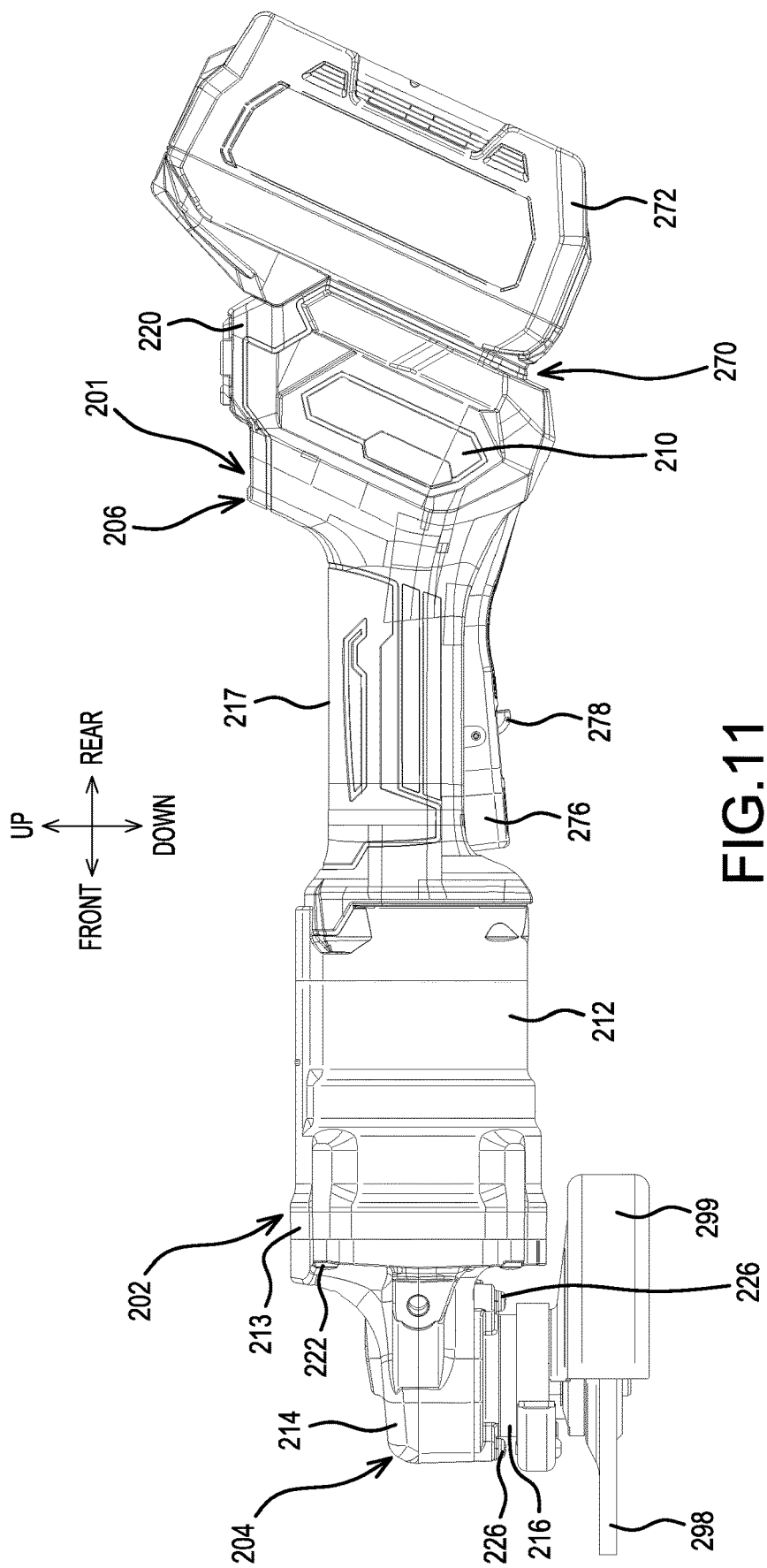
FIG. 11 is a left side view of a grinder according to a second embodiment of the present disclosure.
Figure 12:
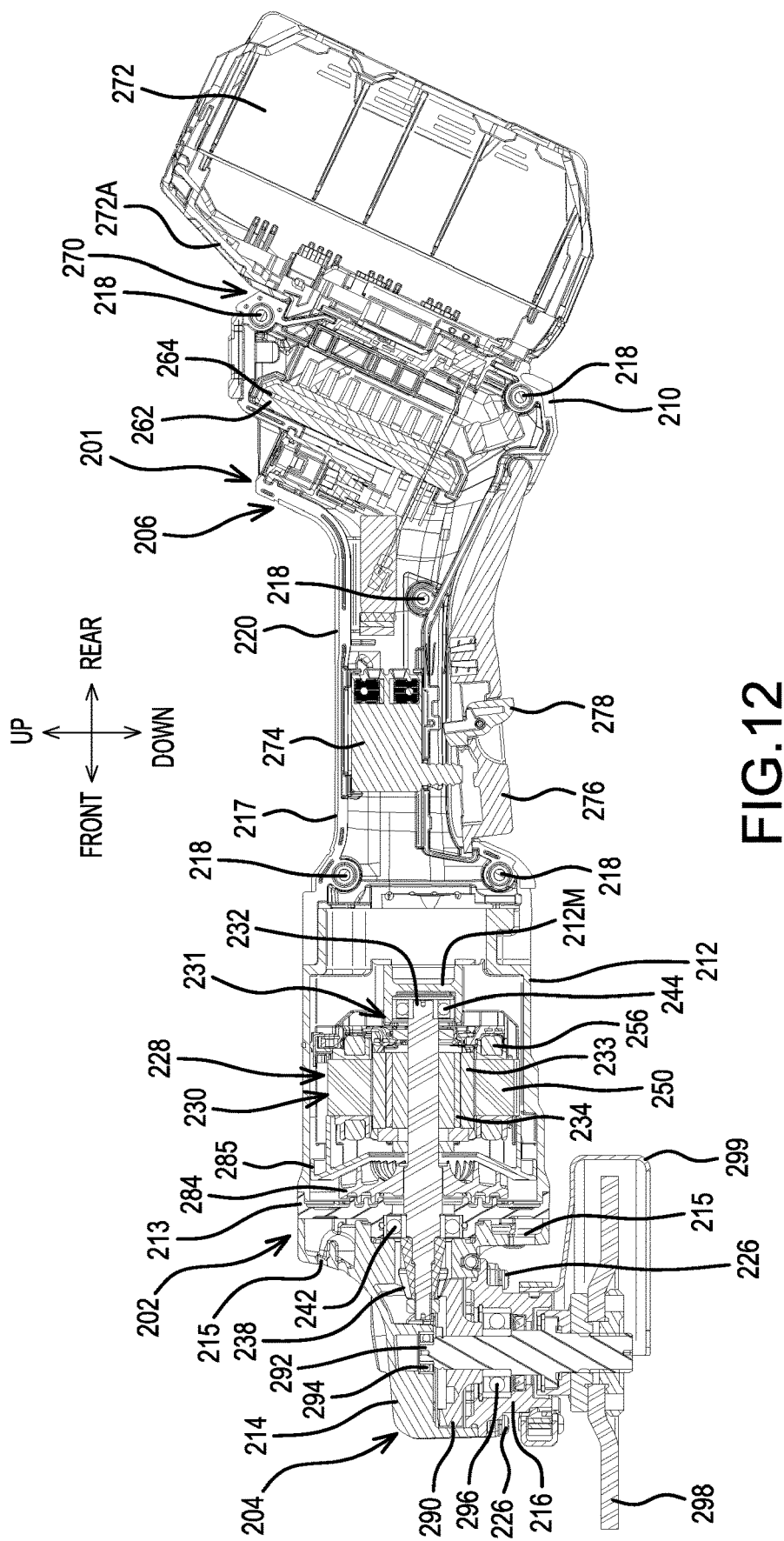
FIG. 12 is a center, longitudinal, cross-sectional view of FIG. 11.
Figure 13:
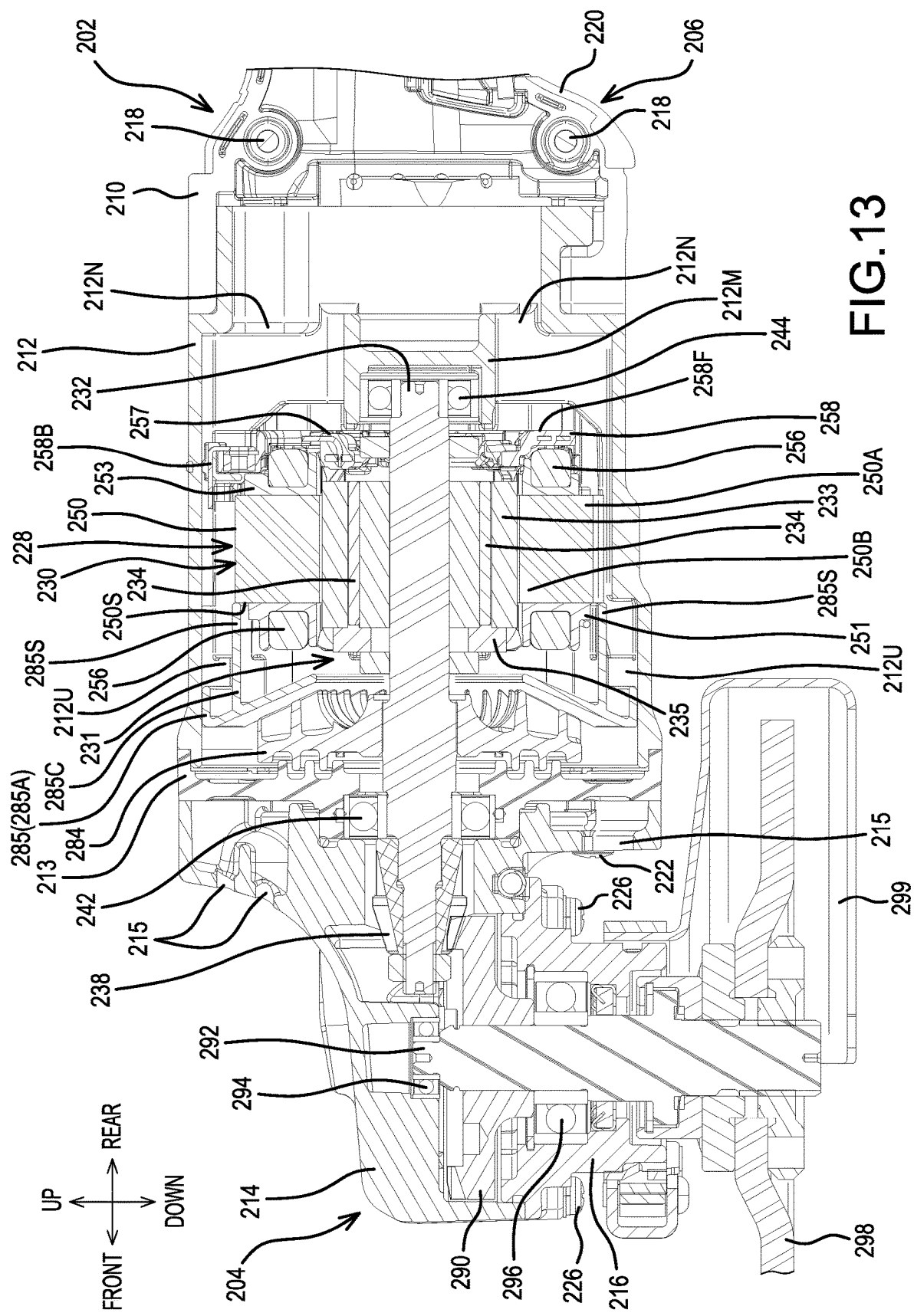
FIG. 13 is an enlarged view of a front portion of FIG. 11.
Figure 14:
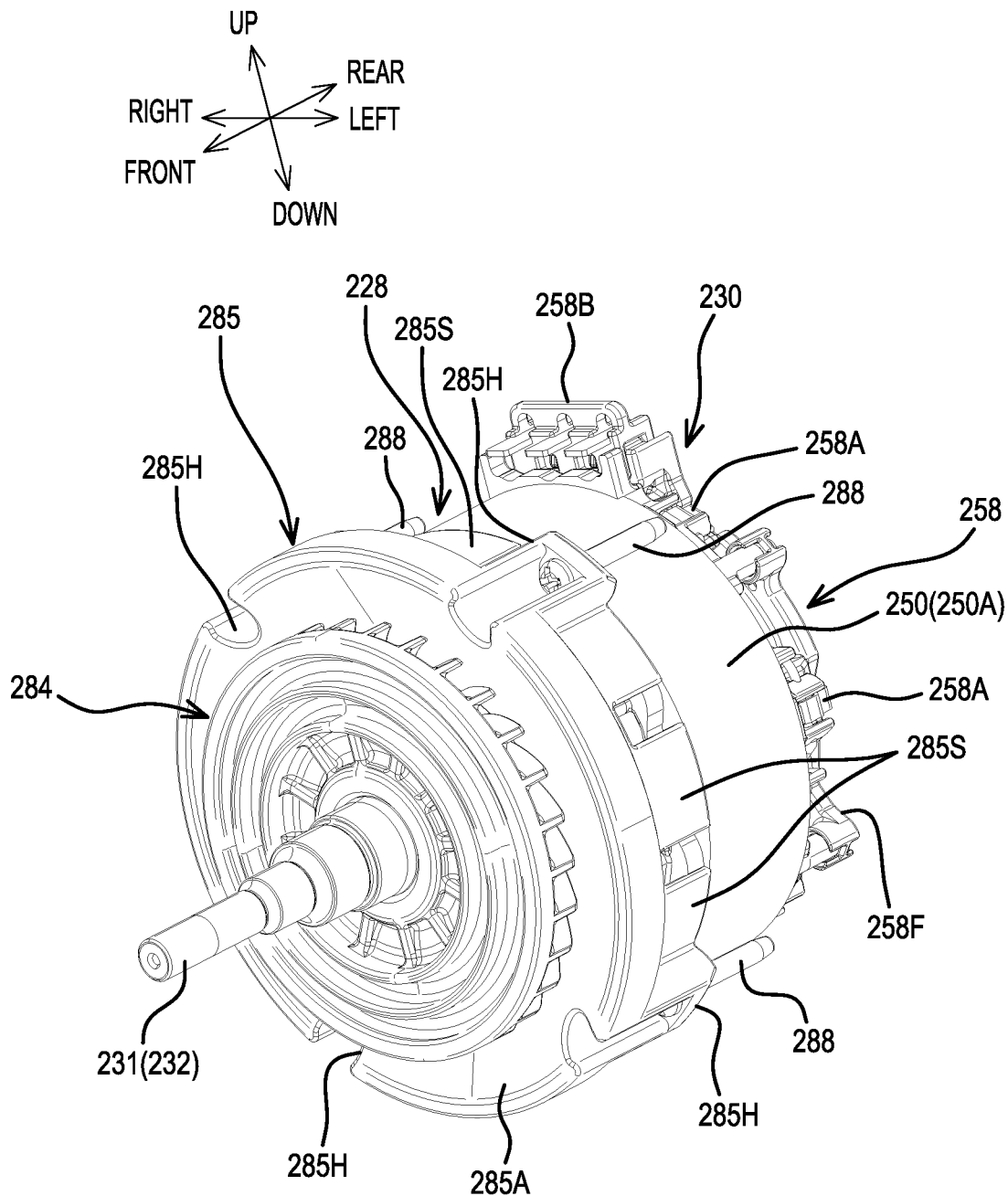
FIG. 14 is an oblique view of a brushless motor, the baffle plate, and a fan in FIG. 12.
Figure 15:
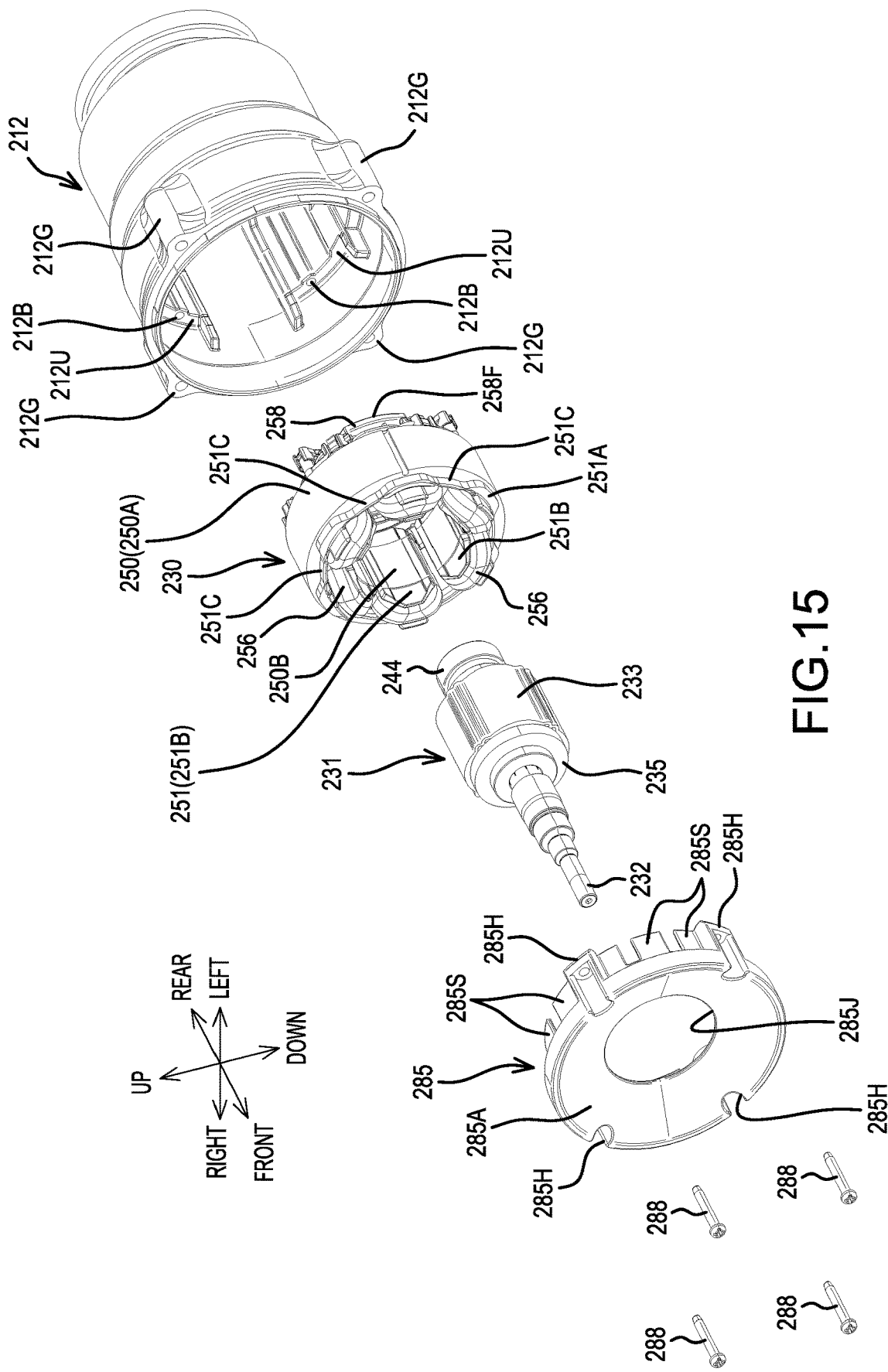
FIG. 15 is a partial, exploded, oblique view of the brushless motor, the motor housing, the screws, and the baffle plate in FIG. 12.
Figure 16:
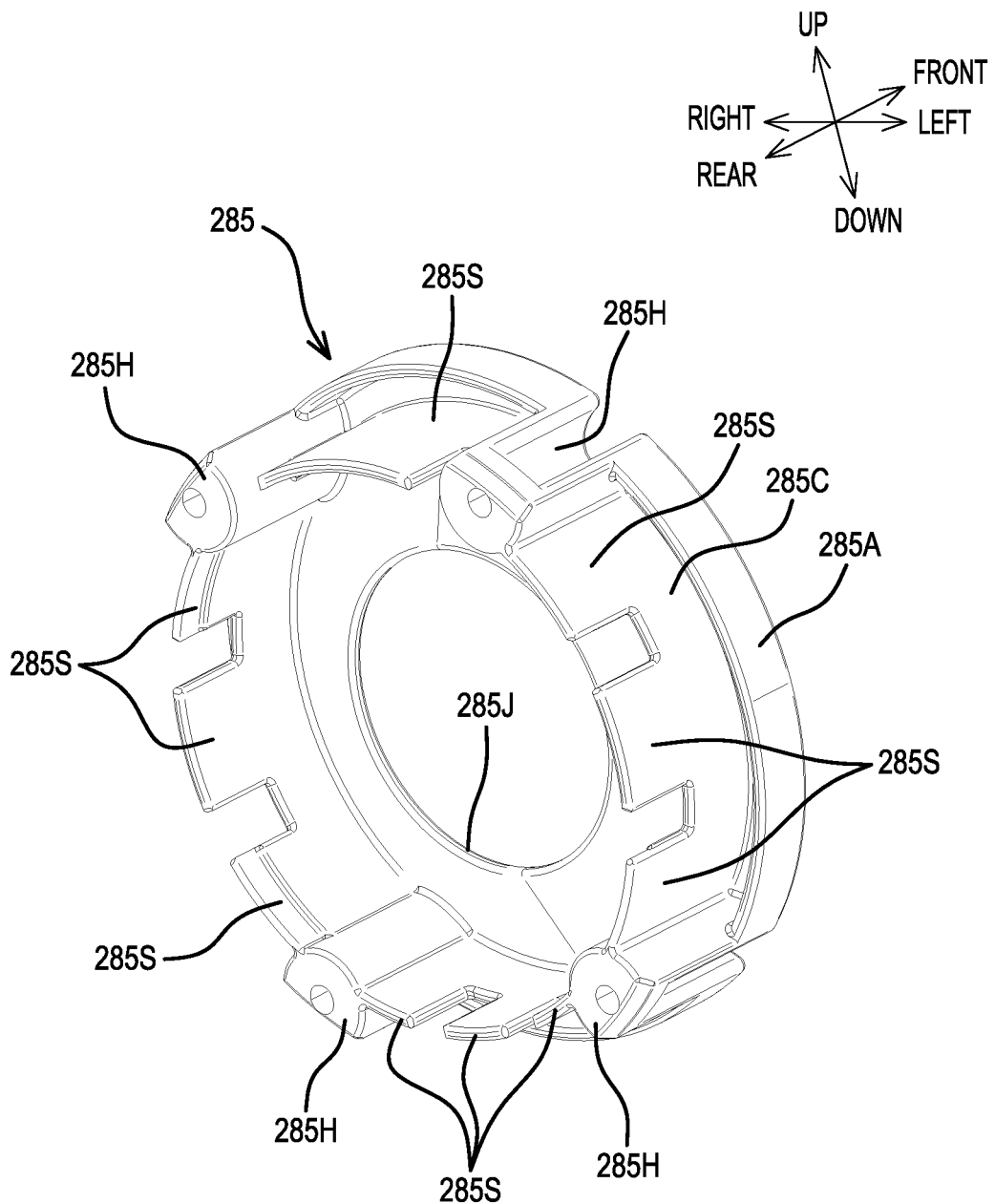
FIG. 16 is an oblique view of the baffle plate in FIG. 12.

FIG. 11 is a left side view of a grinder 201, which is another example of a power tool that is a type of electric work machine according to the present teachings, according to a second embodiment of the present disclosure. FIG. 12 is a center, longitudinal, cross-sectional view of the grinder 201. FIG. 13 is an enlarged view of a front portion of FIG. 12. FIG. 14 is an oblique view of a brushless motor 228, a baffle plate 285, and a fan 284 of the grinder 201. FIG. 15 is a partial, exploded, oblique view of the brushless motor 228, a motor housing 212, screws 288, and the baffle plate 285 of the grinder 201. FIG. 16 is an oblique view of the baffle plate 285 of the grinder 201.

The grinder 201 comprises a main-body part 202 and an output-mechanism part 204.

The main-body part 202 extends in the front-rear direction. The output-mechanism part 204 is provided at a front side of the main-body part 202.

The outer wall of the main-body part 202 and the outer wall of the output-mechanism part 204 form a housing 206.

The housing 206 comprises a rear housing 210, the motor housing 212, a first bearing retainer 213, a gear housing 214, and a second bearing retainer 216.

The rear housing 210, the motor housing 212, and the first bearing retainer 213 form the outer wall of the main-body part 202.

The rear housing 210 is divided into left and right halves. The left half and the right half of the rear housing 210 are aligned by a plurality of screws 218 extending in the left-right direction. A cover 220, which is divided into left and right halves, is affixed to the outer surface of the rear housing 210. The front-half portion of the rear housing 210 and the front-half portion of the cover 220 constitute the portion that is gripped by the user, i.e. a grip part 217.

The motor housing 212 is coupled to the front side of the rear housing 210. The motor housing 212 has a tube part, which has a tube shape and extends over the entirety of the motor housing 212. The motor housing 212 has a bottom part 212M. The bottom part 212M has a plurality of holes 212N serving as vents in the front-rear direction.

The first bearing retainer 213 has a ring shape. The first bearing retainer 213 extends in the up-down and left-right directions. The first bearing retainer 213 has a plurality of air-exhaust holes (not shown). Each of the air-exhaust holes has an arcuate shape.

The gear housing 214 and the second bearing retainer 216 form the outer wall of the output-mechanism part 204.

The gear housing 214 is coupled to the motor housing 212 at the front side via the first bearing retainer 213. The gear housing 214 and the first bearing retainer 213 are both fastened to the motor housing 212 by a plurality (four) of screws 222 extending in the front-rear direction. The gear housing 214 has a plurality of air-exhaust holes 215. The air-exhaust holes 215 are disposed above and below a rear portion of the gear housing 214. The air-exhaust holes 215 are fluidly connected to the air-exhaust holes of the first bearing retainer 213 via the interior of a rear-end portion of the gear housing 214.

As shown in FIG. 15, the motor housing 212 has screw bosses 212G for the screws 222. In addition, a plurality (two) of raised parts 212U, which protrude inward in the radial direction more than other portions do, are provided on the inner surface of the motor housing 212. The raised parts 212U are disposed above and below. A plurality (two each for a total of four) of screw-boss parts 212B are formed on front portions of the raised parts 212U. The screw-boss parts 212B extend frontward and rearward. Two of the screw-boss parts 212B are disposed, one on the left and one on the right, on the upper raised part 212U. The other two screw-boss parts 212B are disposed, one on the left and one on the right, on the lower raised part 212U.

It is noted that, unlike the circular saw 1 of the above-described first embodiment, the grinder 201 is held by the user grasping the outer circumference of the motor housing 212. Consequently, with regard to the grinder 201 of the second embodiment, the outer diameter of the motor housing 6 may be made as small as possible. Furthermore, with regard to the grinder 201 of the second embodiment, unlike the circular saw 1 of the first embodiment, the arrangement of the screws 222 is arbitrary. In addition, with regard to the grinder 201, the screws 222 (the screw bosses 212G) are disposed at the upper left, the upper right, the lower left, and the lower right. Thereby, the upper portion, the lower portion, the left portion, and the right portion of the motor housing 212 do not project beyond the screws 222 (the screw bosses 212G), and thus the motor housing 212 can be made more compact.

As shown in FIGS. 11-13, the second bearing retainer 216 is held by the gear housing 214. The second bearing retainer 216 is disposed downward of the gear housing 214. The second bearing retainer 216 is fixed to the gear housing 214 by a plurality (four) of screws 226. The screws 226 extend upward and downward. The screws 226 are inserted from below the second bearing retainer 216.

The electrically powered brushless motor 228 is held by the motor housing 212.

The brushless motor 228 has a stator 230 and a rotor 231. The rotor 231 is disposed on the inner-circumference side of the stator 230. The brushless motor 228 is an inner-rotor type.

The rotor 231 comprises a rotor shaft 232, a rotor core 233, a plurality (four) of permanent magnets 234, a plurality (four) of sensor permanent magnets (not shown), and a sleeve 235.

The pole count of the brushless motor 228 (the rotor 231) is four, the same as the pole count of the brushless motor 5 of the circular saw 1.

The rotor shaft 232 extends in the front-rear direction. The rotor 231 is rotatable, centered on the rotor shaft 232. The rotor shaft 232 is the rotary shaft of the brushless motor 228. A pinion gear 238 is held at a front-end portion of the rotor shaft 232. The pinion gear 238 has a bevel-gear shape. The rotor shaft 232 extends from the interior of the motor housing 212 to the interior of the gear housing 214.

The rotor shaft 232 is supported in a rotatable manner by a front bearing 242 and a rear bearing 244. The front bearing 242 is held by the first bearing retainer 213. The rear bearing 244 is held by the bottom part 212M of the motor housing 212.

The rotor core 233 has a tube shape. The rotor core 233 is disposed around the rotor shaft 232. The rotor core 233 is a rotor iron core. The rotor core 233 is formed by stacking ring-shaped steel sheets.

The permanent magnets 234 are held in the interior of the rotor core 233.

The sensor permanent magnets are held in the interior of the rotor core 233.

The sleeve 235 has a ring shape. The sleeve 235 is made of a metal (brass). The sleeve 235 is disposed around the rotor shaft 232.

The sleeve 235 is adjacent to the rotor core 233. In a plane on the front side of the rotor core 233, the sleeve 235 covers a portion of the rotor core 233 outward in the radial direction.

After the formation of the rotor 231 (and the fan 284 described below), the rotational balance of the rotor 231 is adjusted by shaving off a portion of the sleeve 235. Because the sleeve 235 is made of brass, which is relatively soft, this adjustment is easy to perform.

The sleeve 235 is fixed to the rotor core 233. The sleeve 235 covers a front-end portion of each of the permanent magnets 234.

It is noted that the sleeve 235 may be made of a resin (polymer).

The stator 230 comprises a stator core 250, a first insulator 251, a plurality (six) of second insulators (not shown), a third insulator 253, a plurality (six) of coils 256, a sensor board 257, and a terminal unit 258.

The stator 230 is held by the motor housing 212.

The outer diameter and the slot count of the stator 230 are the same as those of the stator 20 according to the first embodiment.

That is, the stator core 250 is the same as the stator core 50 and comprises a stator-core main body 250A and a plurality of teeth 250B. A front surface of the stator core 250 is a second contact surface 250S. The second contact surface 250S has a ring shape.

The first insulator 251 is the same as the first insulator 51. The first insulator 251 comprises a ring-shaped first insulator main body 251A and a plurality (six) of first tooth covering parts 251B. The first insulator main body 251A comprises a plurality (six) of recessed parts 251C, which are recessed inward in the radial direction relative to adjacent portions (circumferentially-adjacent surfaces). The recessed parts 251C are respectively disposed between adjacent ones of the first tooth covering parts in the circumferential direction.

Second insulators 252 (not shown) are the same as the second insulators 52.

The third insulator 253 is the same as the third insulator 53.

The coils 256 are the same as the coils 56.

It is noted that the second insulators 252 and at least one of the first insulator 251 and the third insulator 253 may be formed integrally.

The sensor board 257 is the same as the sensor board 57.

The terminal unit 258 is the same as the terminal unit 58 and comprises a plurality of fusing terminals 258A (refer to FIG. 14). A rear surface of the terminal unit 58 is a first contact surface 258F, which is opposite of the second contact surface 250S. The first contact surface 258F makes contact with the bottom part 212M of the motor housing 212. In addition, the terminal unit 258 comprises a connecting part 258B. A plurality of power-supply lead wires (not shown) and a plurality of signal lead wires (not shown) are connected to the connecting part 258B. These lead wires pass through the holes 212N of the motor housing 212. It is noted that the terminal unit 58 of the first embodiment likewise has a connecting part, which is the same as the connecting part 258B.

The stator 230 is inserted into the motor housing 212.

A controller 262 is held by a rear portion of the rear housing 210. The controller 262 is the same as the controller 62 of the first embodiment, except for the arrangement (location) thereof, and comprises a control circuit board 264. The controller 262 extends in the up-down direction and the front-rear direction. The controller 262 is held such that a front end of the controller 262 is lower than a rear end thereof. The plurality of power-supply lead wires and the plurality of signal lead wires described above are connected to the control circuit board 264. The control circuit board 264 is electrically connected to the connecting part 258B.

A battery-mounting part 270 is formed at a rear-end portion of the rear housing 210. One battery (battery pack, battery cartridge) 272, which serves as the power supply, is mounted on the battery-mounting part 270.

The battery 272 comprises a battery button 272A. The battery 272 is mounted by being slid downward from the upper side of the battery-mounting part 270. When being mounted, a front end of the battery 272 is lower than a rear end thereof. In addition, the mounted battery 272 is removed by being slid upward while the battery button 272A is manipulated (pressed).

The battery 272 is electrically connected to the controller 262 via terminals inside the battery-mounting part 270.

It is noted that the number of the batteries 272 that can be mounted on the battery-mounting part 270 may be two or more. The battery 272 may be mounted using a mounting technology other than a slide mount technique. In addition, instead of the battery 272 and the battery-mounting part 270, a power-supply cord that is electrically connectable to an AC power supply (commercial power supply) may be provided.

A switch 274 is held in the rear housing 210. The switch 274 is electrically connected to the controller 262 by a switch lead wire (not shown).

A switch lever 276 is disposed downward of the switch 274. The switch lever 276 is held by the rear housing 210. A rear-end portion of the switch lever 276 is supported in a pivotable manner by a rear-lower portion of the rear housing 210. The pivotal movement of the front-end portion of the switch lever 276 downward is restricted by a front-lower portion of the rear housing 210. By virtue of the user manipulating the switch lever 276 by pushing it upward (pulling it upward using a finger), the switch lever 276 pivots upward about the rear-end portion. The switch lever 276, which has moved upward, pushes the plunger of the switch 274 upward, thereby turning the switch 274 ON.

The switch lever 276 comprises a lock part 278. The lock part 278 is a rod-shaped member. When the switch lever 276 is not being manipulated (FIG. 11 and FIG. 12), the lock part 278 has a standing (upright, vertical) attitude such that it extends in the up-down direction (i.e. perpendicular to the longitudinal direction of the grip part 217). The lock part 278 is mounted on the switch lever 276 such that it is pivotable about an axis that extends in the left-right direction. A torsion spring (not shown) is connected to the lock part 278.

When the lock part 278 is not being manipulated (pressed), because the upper-end portion of the lock part 278 approaches a rib of the rear housing 210, upward movement of the switch lever 276 is obstructed, thereby preventing the switch 274 of the brushless motor 228 from turning ON.

In contrast, when the user pivots the lower portion of the lock part 278 against the biasing force of the torsion spring, the lock part 278 assumes an attitude extending in the front-rear direction (i.e. parallel to the longitudinal direction of the grip part 217), and thereby upward movement of the switch lever 276 is no longer held back (blocked). Thereby, by virtue of the user gripping the grip part 217 as is (i.e. in this state), it becomes possible to turn the switch 274 of the brushless motor 228 ON.

In the front-rear direction, the fan 284 and the baffle plate 285, which serves as the tubular member, are provided between the pinion gear 238 of the rotor shaft 232 and the coils 256.

The fan 284 is an axial-flow fan. The fan 284 is fixed to the rotor shaft 232.

The baffle plate 285 comprises a dish part 285A, a tubular part 285C, and a plurality (four) of screw-hole parts 285H.

The same as the baffle plate 25 of the first embodiment, the dish part 285A has a hole 285J.

The tubular part 285C protrudes in a circular-tube shape from a rear surface of the dish part 285A. The tubular part 285C comprises a plurality of protruding parts 285S that are circumferentially distributed around the tubular part 285C as can be seen, e.g., in FIG. 16. The protruding parts 285S are disposed on rear-end portions of the baffle plate 285. Each of the protruding parts 285S protrudes rearward relative to adjacent portions and extends parallel to the rotational axis of the rotor shaft 232. Each protruding part 285S has an arc shape.

Each of the screw-hole parts 285H is disposed from the circumferential edge of the dish part 285A toward the tubular part 285C. The arrangement of the screw-hole parts 285H, viewed rearward from the front side of the baffle plate 285, coincides with the arrangement of the screw-boss parts 212B of the motor housing 212. In the front-rear direction, the locations of the rear-end portions of the screw-hole parts 285H coincide with the locations of the rear-end portions of the protruding parts 285S.

The baffle plate 285 is screw-fastened to the tube-shaped motor housing 212 in the state in which the baffle plate 285 is in contact with the stator 230. That is, a plurality (four) of screws 288 is provided, which respectively pass through the screw-boss parts 212B and the corresponding screw-hole parts 285H. As can be seen in FIGS. 14-16, the screw holes defined in the screw hole parts 285H are disposed radially outward of the protruding parts 285S, because the screws 288 are respectively screwed into the screw bosses 212G of the motor housing 212, which radially surrounds the stator 230.

Each of the protruding parts 285S of the baffle plate 285 is disposed outward in the radial direction of the first insulator 251; i.e. the protruding parts 285S radially surround the first insulator 251. In addition, each of the screw-hole parts 285H is disposed outward in the radial direction of the corresponding recessed part 51C of the first insulator 251 and each screw-hole part 285H is interleaved between two circumferentially adjacent ones of the protruding parts 285S, as can be seen in FIG. 16. Each of the protruding parts 285S and the portion of each of the screw-hole parts 285H that is inward in the radial direction make contact with the second contact surface 250S of the stator-core main body 250A. The second contact surface 250S is defined on a first axial end surface that extends perpendicular to the rotational axis of the rotor shaft 232 and extends parallel to the first axial end surface. Each of the protruding parts 285S and all of the portions of the screw-hole parts 285H that are inward in the radial direction make contact with the ring-shaped second contact surface 250S over (along) its entire circumference. Each Longitudinal terminal ends of the protruding parts 285S and the portion of each of the longitudinal terminal ends of the screw-hole parts 285H that is inward in the radial direction push the stator core 250 rearward. Each of the screw-hole parts 285H provides both a screw hole function and a pushing function.

The stator 230 is sandwiched between the baffle plate 285 and the bottom part 212M of the motor housing 212. The stator 230 is supported by the bottom part 212M of the motor housing 212 at the first contact surface 258F, which is defined on a first axial end surface that extends perpendicular to the rotational axis of the rotor shaft 232.

The load on the stator core 250 of the baffle plate 285 due to the four screws 288 corresponds to the number of the screws 288.

The pinion gear 238 meshes with a bevel gear 290. The tooth count of the pinion gear 238 is less than the tooth count of the bevel gear 290. The bevel gear 290 is fixed to a spindle 292.

The spindle 292, which serves as the output part, forms a substantially 90° angle with a rotor shaft 232. The spindle 292 extends in the up-down direction. The spindle 292 (the output shaft of the output-mechanism part 204) forms a substantially 90° angle with the rotor shaft 232, and the grinder 201 is an angle tool (angle power tool).

An upper portion of the spindle 292 is disposed within the gear housing 214. The center portion of the spindle 292 is disposed within the second bearing retainer 216. A lower portion of the spindle 292 is exposed beyond the second bearing retainer 216.

An upper-end portion of the spindle 292 is contained within a spindle upper bearing 294. The spindle upper bearing 294 is held by the gear housing 214. A center portion of the spindle 292 is contained within a spindle center bearing 296. The spindle center bearing 296 is fixed to the second bearing retainer 216.

The grinding wheel 298, which has a disk shape, is mounted on (at) a lower-end portion of the spindle 292. The grinding wheel 298 is a tool accessory. A wheel cover 299 is mounted on a lower portion of the second bearing retainer 216. The wheel cover 299 is disposed around the grinding wheel 298.

The grinder 201 configured in this manner operates, for example, as follows.

That is, the user mounts the charged battery 272 on the battery-mounting part 270. Then, the user pushes the switch lever 276 upward while releasing the lock of the lock part 278. In so doing, the switch 274 of the brushless motor 228 turns ON. Thereby, electric power to the stator 230 is controlled by the control circuit board 264, and the rotor 231 rotates. Thereby, the pinion gear 238, which is mounted on a rotor shaft 232, rotates. In so doing, the speed of the spindle 292 is reduced via the bevel gear 290 and rotates, and the grinding wheel 298 mounted thereon rotates. The user can perform grinding by bringing the grinding wheel 298, which rotates, into contact with the workpiece.

When the user lets go of the switch lever 276, the switch lever 276 returns downward, and the switch 274 of the brushless motor 228 turns OFF. Thereby, the rotation of the rotor shaft 232 stops. Accordingly, the rotation of the bevel gear 290, the spindle 292, and the grinding wheel 298 stops. Owing to the torsion spring, the lock part 278 returns to an attitude that locks (blocks) the pushing of the switch lever 276.

In addition, owing to the rotation of the rotor shaft 232, the fan 284 rotates, thereby creating a flow of air (a draft) to the air-exhaust holes of the first bearing retainer 213 and the air-exhaust holes 215 of the gear housing 214. This draft is rectified by the dish part 285A of the baffle plate 285. Then, owing to this draft, the internal mechanisms of the grinder 201, such as the brushless motor 228 and the controller 262, are cooled.

The air-suction portion of the grinder 201, which sucks air from the outside, relating to this draft is the installation portion of the switch lever 276 of the rear housing 210. At least a portion of this draft passes through the holes 212N of the motor housing 212. Thereby, the holes 212N also serve as vents.

When designing or prototyping another type of grinder (second electric work machine) that, while using the brushless motor 228 and the motor housing 212 of the grinder 201 (first electric work machine) described above, differs in the rotational speed principally used in the brushless motor 228, in the situation in which the occurrence of vibration or noise of a prescribed extent or more is recognized to be due to resonance of the stator 230, the vibration and the noise of the separate type of grinder is curtailed, for example, as follows. That is, the number of the screws 288 that fix the baffle plate 285 to the motor housing 212 is reduced to three. In addition, a motor housing having five or more of the screw-boss parts 212B is prepared, and the number of the screws 288 that fix the baffle plate 285 is set to five or more.

By modifying the number of the screws 288 in this manner, the axial load on the stator 230 is changed. Thereby, the stiffness of the stator 230 is changed. Accordingly, the resonant frequency of the stator 230 is changed. Thereby, the vibration and the noise of the separate type of grinder is reduced.

The reduction of such vibration and noise can be accomplished not only by modifying the type of the brushless motor 228 but also by modifying the number of the screws 288. Thereby, the same type of the brushless motor 228 can be utilized in various grinders while still achieving reduced vibration and noise. Accordingly, cost is reduced.

In addition, the reduction of such vibration and noise can be accomplished not only by modifying the material (Young's modulus) of the baffle plate 285 but also by modifying the number of the screws 288. Thereby, the cost to curtail the occurrence of vibration and to curtail the occurrence of noise can be reduced.

The second embodiment may be modified according to the same modified examples as the first embodiment, where appropriate.

Rotational Speed, Etc. Of the Brushless Motor

The brushless motors 5, 228 according to the first and second embodiments are capable of rotating at a higher speed than a brushed motor. As described above, the highest rotational speed of the brushless motors 5, 228 is 30,000 rpm. In the brushless motors 5, 228 that run at such a high speed, there is a strong possibility that resonance will occur. In a trial conducted by the applicant, the effect of the occurrence of resonance in a brushless motor whose highest rotational speed was 14,600 rpm or higher was greater than in a brushless motor whose highest rotational speed was lower than 14,600 rpm. Thereby, in a brushless motor whose highest rotational speed was 14,600 rpm or higher, the utility of the change in the resonant frequency due to screws was greater.

In addition, in a brushless motor whose highest rotational speed was 25,000 rpm or higher, the utility of the change in the resonant frequency due to screws was much greater.

Furthermore, in a brushless motor whose highest rotational speed was 50,000 rpm or higher, the utility of the change in the resonant frequency due to screws was even much greater.

In addition, in a brushless motor whose highest rotational speed was 80,000 rpm or higher, the utility of the change in the resonant frequency due to the screws was yet even greater.

Optional "Soft No-Load" Rotational Function

So-called "soft no-load" is not performed in the circular saw 1 of the first embodiment or the grinder 201 of the second embodiment. In soft no-load, the motor is rotated when not performing work (during no load on the tool accessory) at a rotational speed (rotational speed that is the maximum rotational speed when not performing work or less) that is less than the maximum rotational speed (maximum rotational speed when performing work) when performing work (when the tool accessory is under (experiencing) a load). For example, in the case of a hammer drill, when the motor is rotated at the same rotational speed when not performing work and when performing work, electric-power consumption and vibration become relatively large. Accordingly, in the case of a hammer drill, soft no-load is performed, and thereby a reduction in electric-power consumption and vibration is achieved.

The amount of working noise, which is sound generated when performing work, is comparatively large in an electric work machine in which soft no-load is performed, such as in a hammer drill. Thereby, even if noise due to stator resonance is generated when performing work, it is masked by the working noise and therefore goes relatively unnoticed by the user. In addition, if stator resonance occurs at the rotational speed when performing work and the rotational speed when not performing work is greatly reduced compared with the rotational speed when performing work owing to soft no-load, noise due to stator resonance tends not to occur when not performing work.

For example, if the (maximum) rotational speed when performing work is given as R (rpm), the rotational-speed range, which is the amount decreased when not performing work, is given as r (rpm), and the (maximum) rotational speed when not performing work is given as R-r, then in a hammer drill in which noise due to stator resonance is generated at R=18,000, the possibility that noise due to stator resonance will be generated at r=5,000 is comparatively low. Even if r=3,000 at R=18,000, the possibility that noise due to stator resonance when not performing work will be generated is likewise low. On the other hand, if r=2,000 at R=18,000, the rotational speed when not performing work R-r is close to the rotational speed when performing work R, that is, the change in R-r relative to R is small, and the possibility that noise due to stator resonance when not performing work will occur is high. Because the noise when not performing work is not masked by the working noise, it tends to be heard by the user.

In a trial conducted by the applicant, in the situation in which the quotient resulting from dividing the rotational-speed range r, which is the amount decreased, by the rotational speed when working R was 12% or less, that is, in the situation in which the relation $(r/R) \leq 0.12$ (Equation (1)) was satisfied, noise when not performing work could also be sufficiently reduced, and therefore the change in the resonant frequency due to the screws was more useful. Furthermore, the smaller the value of r/R, the greater the utility of the change in the resonant frequency due to the screws. For example, in the situations of $(r/R) \times 100 = 12, 10, 8, 6, 5, 4, 2$, the utility of the change in the resonant frequency due to the screws successively increased.

Of course, in the situation of (r/R)=0, that is, in the situation in which soft no-load is not performed and the rotational speeds when performing work and when not performing work are the same, the change in the resonant frequency due to the screws is sufficiently useful. For example, with regard to the circular saw 1 of the first embodiment, in which soft no-load is not performed, and the grinder 201 of the second embodiment, the change in the resonant frequency due to the screws is sufficiently useful. In addition, in other electric work machines as well, as in a blower, in which the rotational speed is the same when performing work, when a draft blows against a target, and when not performing work, when a draft does not blow against the target (the draft continues to blow at the same strength as long as the power supply is turned ON), the utility of a change in the resonant frequency due to the screws is sufficiently high.

Additional aspects of the present teachings include, but are not limited to:

1. A method of manufacturing a second electric work machine, the type of which is different from a first electric work machine in which a stator of a brushless motor is fixed by a first number of screws, the method comprising:
fixing the stator using a second number of screws, which differs from the first number of screws.
2. The method according to the above Aspect 1, wherein the stator has a tube-shaped stator core.
3. The method according to the above Aspect 1 or 2, wherein the stator core is formed by stacking ring-shaped steel sheets.
4. The method according to any one of the above the above Aspects 1-3, wherein the stator is fixed via a presser member.
5. The method according to the above Aspect 4, wherein:
the stator has a tube shape;
a rotor is disposed radially inward of the stator;
a fan is configured to be rotated by the rotor; and
the presser member is a baffle plate, which is configured to rectify a cooling air draft created by the fan.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as power tools and other electric devices that utilize an electric motor as its drive source.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Circular saw (electric work machine)
5, 228 Brushless motor
6, 212 Motor housing
6C, 212C Tube part
6M, 212M Bottom part
20, 230 Stator
21, 231 Rotor
22, 232 Rotor shaft
25, 285 Baffle plate (tubular members, presser members)
25S, 285S Protruding part
31 Output shaft (output part)
50, 250 Stator core
50S, 250S Second contact surface
56, 256 Coils
58F, 258F First contact surface
59, 233 Rotor core
60, 234 Permanent magnets
68, 288 Screws
201 Grinder (electric work machine)
292 Spindle (output part)

The invention claimed is:

1. An electric work machine comprising:
a motor housing including a tube part and a bottom part;
a brushless motor including a stator, and a rotor, which is disposed within the stator and is rotatable relative to the stator about a rotational axis, the stator having a first contact surface on a first axial end surface that extends perpendicular to the rotational axis;
a tubular member made of a polymer, the tubular member having protruding parts that are circumferentially distributed around the tubular member, and at least three screw-hole parts that are circumferentially distributed around the tubular member and are respectively interleaved between two circumferentially-adjacent ones of the protruding parts; and
an output part;
wherein:
the stator includes a stator core, which has a tube shape and has a second contact surface on a second axial end surface that extends perpendicular to the rotational axis and parallel to the first axial end surface, and a plurality of coils wound on the stator core;
the stator is held by the motor housing such that the first contact surface is in contact with the bottom part of the motor housing;
the rotor includes a rotor shaft, which is rotatably supported by the motor housing, a rotor core, which is fixed to the rotor shaft, and one or more permanent magnets, which is (are) supported by the rotor core;
the second contact surface of the stator core is ring-shaped;
the protruding parts of the tubular member and the at least three screw-hole parts press against the second contact surface of the stator core; and
the tubular member is fixed to the motor housing by at least three screws that respectively pass through the at least three screw-hole parts.

2. The electric work machine according to claim 1, wherein the screws are disposed other than at a lower portion of the electric work machine when held in a normal attitude.

3. The electric work machine according to claim 1, wherein the bottom part has a vent.

4. The electric work machine according to claim 1, wherein the bottom part holds a bearing, which rotatably supports the rotor shaft.

5. The electric work machine according to claim 1, wherein:
the stator includes a terminal unit, which is electrically connected to each of the coils; and
the first contact surface is defined on the terminal unit.

6. The electric work machine according to claim 1, wherein the stator core has an outer diameter that is equal to or greater than an axial length of the stator core.

7. The electric work machine according to claim 1, further comprising:
   a fan, which is rotated by the rotor;
   wherein the tubular member is a part of a baffle plate, which is configured to rectify a cooling air draft created by the fan.

8. The electric work machine according to claim 1, wherein the stator core comprises a plurality of stacked ring-shaped steel sheets.

9. The electric work machine according to claim 1, wherein the rotor core comprises a plurality of stacked ring-shaped steel sheets.

10. The electric work machine according to claim 1, wherein:
    the tubular member is a part of a baffle plate;
    the rotor shaft extends through a hole in the baffle plate; and
    an insulator is supported on the stator core and is disposed between the baffle plate and the first axial end surface of the stator core in the direction of the rotational axis.

11. The electric work machine according to claim 10, wherein:
    each of the protruding parts is arc-shaped; and
    the protruding parts radially surround an outer peripheral surface of the insulator.

12. The electric work machine according to claim 10, wherein:
    the insulator has a radially-extending ring-shaped part, an outer circumferential surface on the radially-extending ring-shaped part, and a plurality of recessed parts that are recessed radially inward from circumferentially-adjacent surfaces of the outer circumferential surface; and
    the protruding parts are disposed radially outward of the recessed parts.

13. The electric work machine according to claim 10, wherein screw holes defined in the screw-hole parts are disposed radially outward of the protruding parts.

14. The electric work machine according to claim 10, wherein:
    the protruding portions extend parallel to the rotational axis; and
    longitudinal terminal ends of the protruding portions abut on the second contact surface in an axially loaded state that raises a resonant frequency of the stator in the axial direction.

15. The electric work machine according to claim 10, wherein:
    the insulator has a radially-extending ring-shaped part, an outer circumferential surface on the radially-extending ring-shaped part, and a plurality of recessed parts that are recessed radially inward from circumferentially-adjacent surfaces of the outer circumferential surface;
    each of the protruding parts is arc-shaped;
    the protruding parts extend parallel to the rotational axis, are disposed radially outward of the recessed parts and radially surround the outer peripheral surface of the insulator;
    screw holes defined in the screw-hole parts are disposed radially outward of the protruding parts; and
    longitudinal terminal ends of the protruding portions abut on the second contact surface in an axially loaded state that raises a resonant frequency of the stator in the axial direction.

16. An electric circular saw comprising:
    a brushless motor including a stator and a rotor, which is disposed in an interior of the stator and extends in a left-right direction of the electric circular saw;
    a motor housing including a tube part, which houses the stator, and a bottom part that is disposed leftward of the tube part in the left-right direction;
    an output shaft rotatably driven by the rotor and configured to attach a saw blade, the output shaft extending in the left-right direction in parallel with the rotor; and
    at least three screws extending in the left-right direction in parallel with the rotor and fixing the stator to the motor housing;
    wherein:
    the stator includes a stator core, an insulator, which is supported on the stator core, and one or more coils, which is (are) supported on the insulator;
    the rotor includes a rotor core and one or more permanent magnets, which is (are) supported by the rotor core;
    the maximum rotational speed of the rotor is 25,000 rpm or higher; and
    at least one of the at least three screws is disposed above the other ones of the screws in an up-down direction that is perpendicular to the left-right direction and a front-rear direction.

17. The electric circular saw according to claim 16, wherein the maximum rotational speed is the same when the electric work machine is performing work and when not performing work.

18. The electric circular saw according to claim 16, wherein:
    the maximum rotational speed includes a maximum rotational speed when performing work and a maximum rotational speed when not performing work, which differ from one another; and
    the maximum rotational speed when performing work is higher than the maximum rotational speed when not performing work.

19. The electric circular saw according to claim 16, further comprising:
    a tubular member made of a polymer, the tubular member having protruding parts that are circumferentially distributed around the tubular member, and at least three screw-hole parts that are circumferentially distributed around the tubular member;
    wherein the at least three screws respectively pass through the at least three screw-hole parts.

20. The electric circular saw according to claim 19, wherein:
    each of the protruding parts is arc shaped;
    screw holes defined in the screw-hole parts are disposed radially outward of the protruding parts; and
    the protruding parts radially surround an outer peripheral surface of the insulator.

* * * * *